(12) United States Patent
Ozeki et al.

(10) Patent No.: US 12,644,729 B2
(45) Date of Patent: Jun. 2, 2026

(54) MOTION DETECTOR

(71) Applicants:Oriental Motor Co., Ltd., Tokyo (JP);
Sakao Ozeki, Kakegawa (JP)

(72) Inventors: Sakao Ozeki, Kakegawa (JP); Akihiko Houda, Tsukuba (JP); Masayuki Someya, Tsukuba (JP)

(73) Assignees: Oriental Motor Co., Ltd., Tokyo (JP);
Sakao Ozeki, Kakegawa (JP)

( * ) Notice: Subject to any disclaimer, the term of this patent is extended or adjusted under 35 U.S.C. 154(b) by 208 days.

(21) Appl. No.: 18/568,341

(22) PCT Filed: Jun. 8, 2022

(86) PCT No.: PCT/JP2022/023100
§ 371 (c)(1),
(2) Date: Dec. 8, 2023

(87) PCT Pub. No.: WO2022/260070
PCT Pub. Date: Dec. 15, 2022

(65) Prior Publication Data
US 2024/0369379 A1 Nov. 7, 2024

(30) Foreign Application Priority Data

Jun. 8, 2021 (JP) ................................. 2021-096214
Sep. 30, 2021 (JP) ................................. 2021-161665

(51) Int. Cl.
*G01D 5/14* (2006.01)
*G01D 5/20* (2006.01)

(52) U.S. Cl.
CPC ........... *G01D 5/145* (2013.01); *G01D 5/2033* (2013.01)

(58) Field of Classification Search
CPC .............................. G01D 5/145; G01D 5/2033
(Continued)

(56) References Cited

U.S. PATENT DOCUMENTS 5,663,641 A 9/1997 Morita
8,283,914 B2 10/2012 Mehnert et al.
(Continued)

FOREIGN PATENT DOCUMENTS

JP H08136558 A 5/1996
JP 4712390 B2 6/2011
(Continued)

OTHER PUBLICATIONS

Extended European Search Report including Written Opinion for Application No. 22820249.5 dated Apr. 14, 2025, pp. 1-9.
(Continued)

*Primary Examiner* — Stephanie E Bloss
*Assistant Examiner* — Michael A Harrison
(74) *Attorney, Agent, or Firm* — Lerner David LLP

(57) ABSTRACT

A detector that is downsized by efficiently applying a high-period alternating magnetic field to a magnetic wire by use of a plurality of magnetic-field generation sources is provided. A detector 400 detects motion of a moving body 410 by use of a power generation sensor 420. The power generation sensor includes a magnetic wire 421 and a coil 422, and the moving body includes a soft magnetic body portion 411 and a plurality of magnetic-field generation sources 412. The power generation sensor is disposed in a vicinity of a trajectory drawn by the magnetic-field generation sources by the motion of the moving body. A direction of motion of each of the magnetic-field generation sources is perpendicular to an axial direction of the magnetic wire when the magnetic-field generation source approaches the power generation sensor, a magnetization direction of the magnetic-field generation source is parallel to the axial direction of the magnetic wire or is parallel to a direction facing the magnetic wire, at least one part of a place from an axial-direction central portion to an axial-direction first end
(Continued)

portion of the magnetic wire faces the magnetic-field generation source, and at least a part of a place from the at least one part to an axial-direction second end portion of the magnetic wire faces the soft magnetic body portion.

13 Claims, 30 Drawing Sheets

(58) Field of Classification Search
USPC ..................................................... 324/207.25
See application file for complete search history.

(56) References Cited

U.S. PATENT DOCUMENTS

| | | | |
|---|---|---|---|
| 9,528,856 B2 | 12/2016 | Gehringer et al. | |
| 2010/0148764 A1* | 6/2010 | Abe ........................ | G01D 5/145 |
| | | | 324/207.25 |
| 2010/0213927 A1* | 8/2010 | Mehnert .............. | G01P 3/4815 |
| | | | 324/207.13 |
| 2012/0268109 A1 | 10/2012 | Mehnert et al. | |
| 2013/0200883 A1* | 8/2013 | Mehnert ................ | G01D 5/145 |
| | | | 324/207.2 |
| 2017/0115135 A1* | 4/2017 | Kasuga ................... | G01D 5/245 |
| 2017/0122781 A1 | 5/2017 | Oyama et al. | |
| 2018/0051973 A1 | 2/2018 | Schrubbe | |
| 2021/0023697 A1* | 1/2021 | Watanabe .............. | G01D 5/145 |
| 2021/0302148 A1 | 9/2021 | Loeken et al. | |

FOREIGN PATENT DOCUMENTS

| | | |
|---|---|---|
| JP | 5297085 B2 | 9/2013 |
| JP | 5511748 B2 | 6/2014 |
| JP | 5730809 B2 | 6/2015 |
| JP | 201783393 A | 5/2017 |
| JP | 202121706 A | 2/2021 |
| WO | 2020015834 A1 | 1/2020 |

OTHER PUBLICATIONS

International Search Report for Application No. PCT/JP2022/023100 mailed Aug. 9, 2022, pp. 1-3.

* cited by examiner

|  |  | POWER GENERATION SENSOR | MAGNETIC SENSOR | IDENTIFICATION |
|---|---|---|---|---|
| (A) | FORWARD ROTATION | P | MINUS | P |
|  |  | N | PLUS | N' |
|  | REVERSE ROTATION | P | PLUS | P' |
|  |  | N | MINUS | N |

(B)

| PREVIOUS STATE | NEW STATE | COUNT VALUE |
|:---:|:---:|:---:|
| P | P | 0 |
| P | P' | -2 |
| P | N | -1 |
| P | N' | 1 |
| P' | P | 2 |
| P' | P' | 0 |
| P' | N | -1 |
| P' | N' | 1 |
| N | P | 1 |
| N | P' | -1 |
| N | N | 0 |
| N | N' | 2 |
| N' | P | 1 |
| N' | P' | -1 |
| N' | N | -2 |
| N' | N' | 0 |

FIG. 12C
| | POWER GENERATION SENSOR | FIRST MAGNETIC SENSOR | SECOND MAGNETIC SENSOR | IDENTIFICATION |
|---|---|---|---|---|
| FORWARD ROTATION | P | MINUS | | P |
| | N | PLUS | | N' |
| REVERSE ROTATION | P | | PLUS | P' |
| | N | | MINUS | N |
FIG. 13A
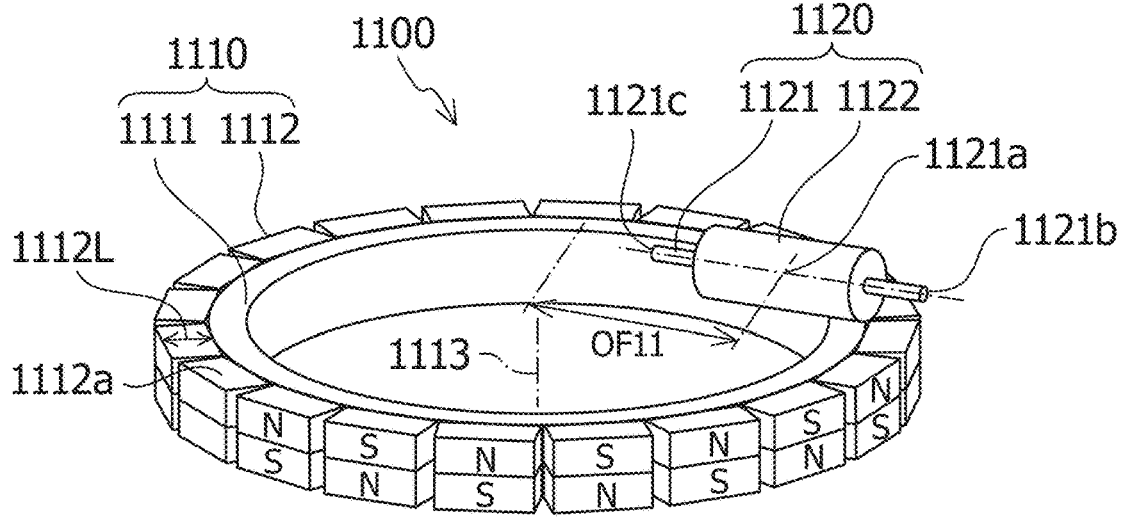
FIG. 13B
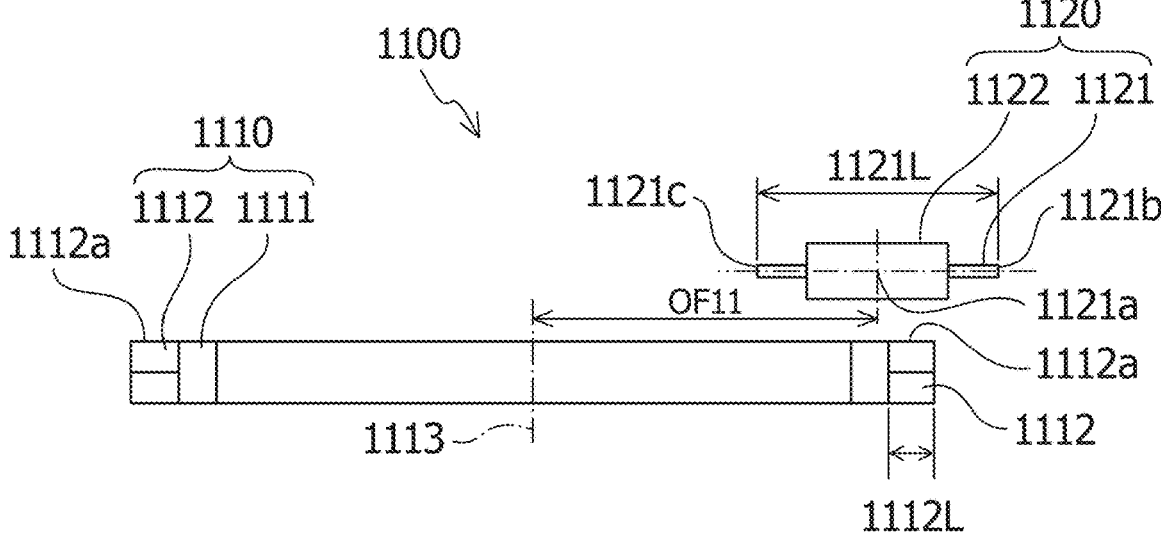

|  | POWER GENERATION SENSOR 1120 | MAGNETIC SENSOR 1440 | IDENTIFICATION |
|---|---|---|---|
| FORWARD ROTATION | P | MINUS | P |
|  | N | PLUS | N′ |
| REVERSE ROTATION | P | PLUS | P′ |
|  | N | MINUS | N |

| PREVIOUS STATE | NEW STATE | COUNT VALUE |
|---|---|---|
| P | P | 0 |
| P | P′ | -2 |
| P | N | -1 |
| P | N′ | 1 |
| P′ | P | 2 |
| P′ | P′ | 0 |
| P′ | N | -1 |
| P′ | N′ | 1 |
| N | P | 1 |
| N | P′ | -1 |
| N | N | 0 |
| N | N′ | 2 |
| N′ | P | 1 |
| N′ | P′ | -1 |
| N′ | N | -2 |
| N′ | N′ | 0 |

| | POWER GENERATION SENSOR 1120 | MAGNETIC SENSOR 1440 | MAGNETIC SENSOR 1441 | IDENTIFICATION |
|---|---|---|---|---|
| FORWARD ROTATION | P | MINUS | | P |
| | N | PLUS | | N' |
| REVERSE ROTATION | P | | PLUS | P' |
| | N | | MINUS | N |

MOTION DETECTOR

TECHNICAL FIELD

The present invention relates to a detector that detects motion of a moving body by use of a power generation sensor.

BACKGROUND ART

A magnetic wire having a large Barkhausen effect (large Barkhausen jump) is known as a Wiegand wire or a pulse wire. The magnetic wire includes a core portion and a skin portion provided so as to surround the core portion. One of the core portion and the skin portion is a soft (soft magnetic) layer in which a reversal of a magnetization direction occurs even in a weak magnetic field, and the other of the core portion and the skin portion is a hard (hard magnetic) layer in which the magnetization direction is not reversed unless a strong magnetic field is applied.

When the hard layer and the soft layer are magnetized in the same orientation along an axial direction of the wire, the following occurs. When an external magnetic field strength in a direction opposite from the magnetization direction increases and a magnetic field strength at which the magnetization direction of the soft layer is reversed is reached, the magnetization direction of the soft layer is reversed. At this time, a large Barkhausen effect occurs, and a pulse signal is induced in a coil wound around the magnetic wire. The magnetic field strength at which the magnetization direction of the soft layer is reversed is referred to as an "operating magnetic field" in this specification. The magnetic wire and the coil are collectively referred to as a power generation sensor.

When the external magnetic field strength described above further increases and a magnetic field strength at which the magnetization direction of the hard layer is reversed is reached, the magnetization direction of the hard layer is reversed. The magnetic field strength at which the magnetization direction of the hard layer is reversed is referred to as a "stabilizing magnetic field" in this specification.

In order to cause a large Barkhausen effect to occur, only the magnetization direction of the soft layer needs to be reversed when the magnetization directions of the hard layer and the soft layer match each other. In a state in which the magnetization directions of the hard layer and the soft layer do not match each other, the following occurs. Even when only the magnetization direction of the soft layer is reversed, a pulse signal is not generated or the pulse signal is extremely small even when the pulse signal is generated.

An output voltage of the magnetic wire has the following features. For example, the output voltage is constant regardless of the speed of change of the magnetic field, and does not cause chattering because the output voltage has hysteresis characteristics with respect to an input magnetic field. Therefore, the magnetic wire is also used in a position detector and the like by being combined with a magnet and a counter circuit. It is also possible to perform operation including peripheral circuits by an output energy of the magnetic wire without the supply of external electric power.

When an alternating magnetic field is applied to the power generation sensor, a total of two pulse signals, that is, one positive pulse signal and one negative pulse signal are generated in one period. The motion of the moving body can be detected by causing a magnet serving as a generation source of a magnetic field to be the moving body and causing the magnetic field applied to the power generation sensor to change by the positional relationship between the magnet, that is the moving body, and the power generation sensor.

However, when only a single power generation sensor is used, a direction of motion is unidentifiable when the direction of motion of the moving body changes. As shown in FIG. 1 in Patent Document 1, the direction of motion can be identified when a plurality of power generation sensors are used, but size and cost of the detector increase.

In Patent Document 2, it is disclosed that a single power generation sensor and another sensor element that is not the power generation sensor are used. In the same document, a case in which a single magnet (dipole) is used and a case in which a plurality of magnets (multipole) are used to improve the resolution are further described.

As a structure example of the detection by a single magnet (FIG. 2 in Patent Document 2), FIG. 1 in Patent Document 3 is given. A structure in which a dipole magnet and a power generation sensor face each other is suitable for downsizing because a diameter can be reduced to an entire length of the power generation sensor. As a structure example for increasing the resolution (FIG. 3 in Patent Document 2), FIG. 1 in Patent Document 4 is given. One of the main usages of this type of motion detector is the detection of a number of rotations in one rotation unit. In a motion detector using a power generation sensor, there has been a problem in that a pulse signal that is supposed to be output is not output in some cases, and the number of rotations cannot be correctly determined in a structure of a single magnet (dipole) in which only two pulses are output for one rotation because there is generally poor accuracy.

In Patent Document 5, it is disclosed that a magnetization direction of a magnetic wire in a power generation sensor is determined by generating a magnetic field by causing a current to flow through a coil in the power generation sensor and monitoring an output state. In the same document, it is disclosed that a number of rotations can be determined even when a single magnet is used by the determination of the magnetization direction as above.

CITATION LIST

Patent Document

[Patent Document 1] Japanese Patent No. 5511748
[Patent Document 2] Japanese Patent No. 4712390
[Patent Document 3] U.S. Pat. No. 9,528,856 B
[Patent Document 4] U.S. Pat. No. 8,283,914 B
[Patent Document 5] Japanese Patent No. 5730809

SUMMARY OF INVENTION

Technical Problem

Using a plurality of power generation sensors at a time of detection of motion easily leads to an increase in size of a detector itself. In addition, even when a single power generation sensor is used, processing for determining a magnetization direction of a magnetic wire in the power generation sensor may become complicated.

Thus, an object of the present invention is to provide a detector that is downsized by efficiently applying a high-period alternating magnetic field to a magnetic wire by use of a single power generation sensor and a plurality of magnetic-field generation sources.

Solution to Problem

A detector according to the present invention detects motion of a moving body by use of a power generation sensor. The power generation sensor includes: a magnetic wire in which a large Barkhausen effect occurs; and a coil wound around the magnetic wire. The moving body includes: a soft magnetic body portion; and a plurality of magnetic-field generation sources mounted on the soft magnetic body portion at even intervals, the plurality of magnetic-field generation sources each have a pair of an N-pole and an S-pole, and magnetic poles of two adjacent ones of the magnetic-field generation sources on a mounting-direction outer side of the magnetic-field generation sources are heteropolar. The power generation sensor is disposed in a vicinity of a trajectory drawn by the plurality of magnetic-field generation sources by the motion of the moving body. A direction of motion of each of the magnetic-field generation sources when the magnetic-field generation source approaches the power generation sensor is perpendicular to an axial direction of the magnetic wire, and a magnetization direction of the magnetic-field generation source when the magnetic-field generation source approaches the power generation sensor is parallel to the axial direction of the magnetic wire or is parallel to a direction facing the magnetic wire. At least one part of a place from an axial-direction central portion to an axial-direction first end portion of the magnetic wire faces the magnetic-field generation source, and at least a part of a place from the at least one part to an axial-direction second end portion of the magnetic wire faces the soft magnetic body portion when the magnetic-field generation source approaches the power generation sensor.

Advantageous Effect of Invention

According to the present invention, it is possible to provide a detector that is downsized by efficiently applying the high-period alternating magnetic field to the magnetic wire by use of the plurality of magnetic-field generation sources.

BRIEF DESCRIPTION OF DRAWINGS

FIG. FIG. 9C(B) is an explanatory view showing synchronization and rotational coordinates of output signals of the power generation sensor and the magnetic sensor based on the fourth embodiment.

FIG. 12C is an explanatory view showing combinations of detection results of the power generation sensor, a first magnetic sensor, and a second magnetic sensor according to the fifth embodiment.

FIG. 13A is a perspective view of a rotation detector based on a sixth embodiment.

FIG. 13B is a cross-sectional view of the rotation detector based on the sixth embodiment.

DESCRIPTION OF EMBODIMENTS

The present invention is described below on the basis of illustrated embodiments. However, the present invention is not limited to the embodiments described below.

First Embodiment

Figure 1A:
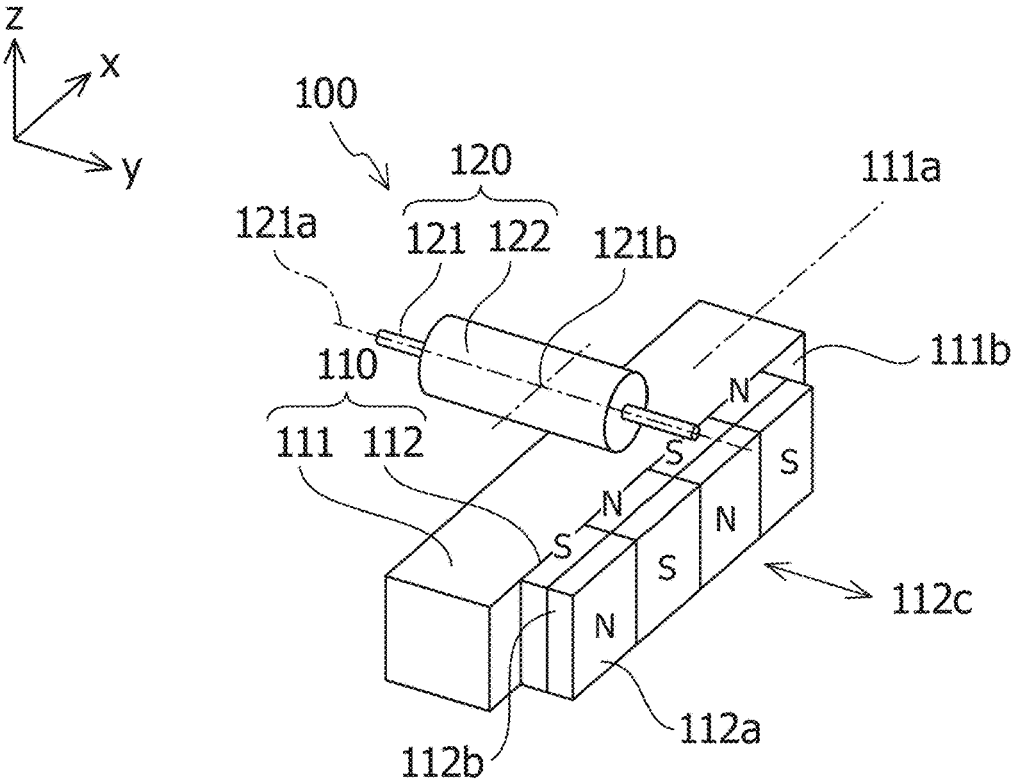
FIG. 1A is a perspective view of a linear-type detector based on a first embodiment.
Figure 1B:
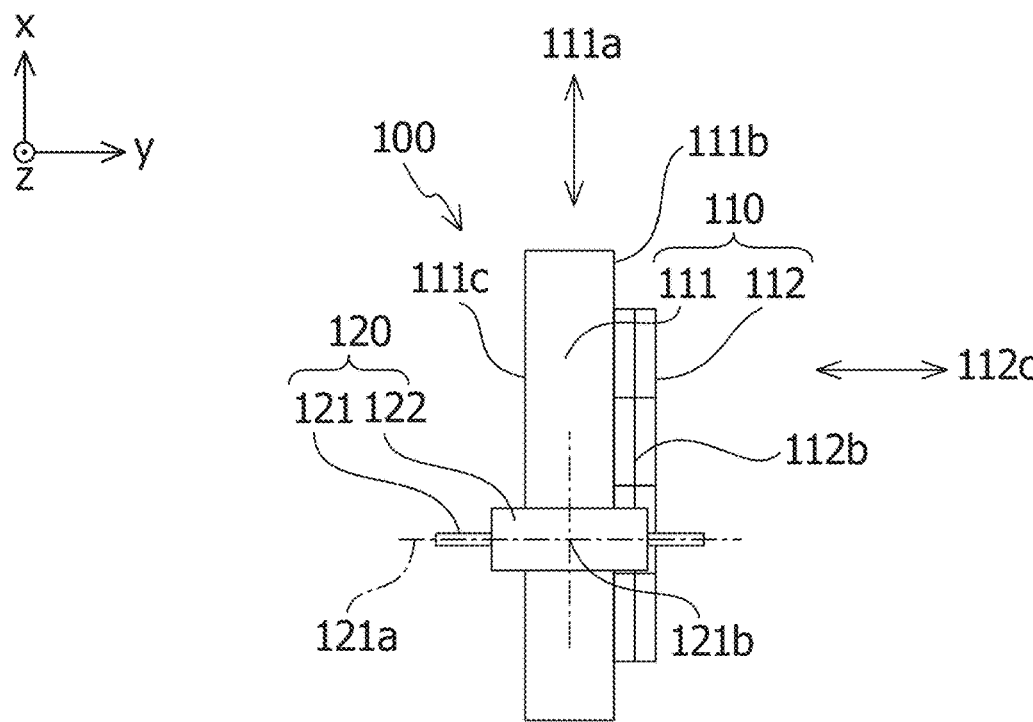
FIG. 1B is an upper view of the linear-type detector based on the first embodiment.

A detector 100 based on a first embodiment is shown in FIG. 1A and FIG. 1B. The detector 100 includes a moving body 110 that linearly moves and one power generation sensor 120. The moving body 110 has a soft magnetic body portion 111 having an elongated cuboid shape and a plurality of magnets (magnetic-field generation sources) 112. A longitudinal direction 111a of the soft magnetic body portion 111 is parallel to an x-axis, a width direction is parallel to a y-axis, and a height direction is parallel to a z-axis.

The plurality of magnets 112 are mounted by being arranged along the longitudinal direction 111a on a width-direction first end surface 111b of the soft magnetic body portion 111. A mounting direction is parallel to the width direction of the soft magnetic body portion 111. Examples of a mounting method include embedding, fitting, and adhesion. The magnets 112 are each magnetized in the width direction of the soft magnetic body portion 111 and each have a pair formed by an N-pole and an S-pole. The magnet 112 has an outer magnetic pole 112a on a width-direction outer side of the soft magnetic body portion 111. The plurality of magnets 112 are disposed such that adjacent outer magnetic poles 112a are heteropolar.

The power generation sensor 120 has a magnetic wire 121 in which a large Barkhausen phenomenon occurs and a coil 122 wound around the magnetic wire 121. The power generation sensor 120 is disposed so as not to interfere with the moving body 110 in a vicinity of a trajectory drawn by the plurality of magnets 112 when the moving body 110 linearly moves along the longitudinal direction 111a of the soft magnetic body portion 111. An axial direction 121a of the magnetic wire 121 is parallel to the width direction of the soft magnetic body 111 (a magnetization direction of the magnets 112).

Figure 2A:
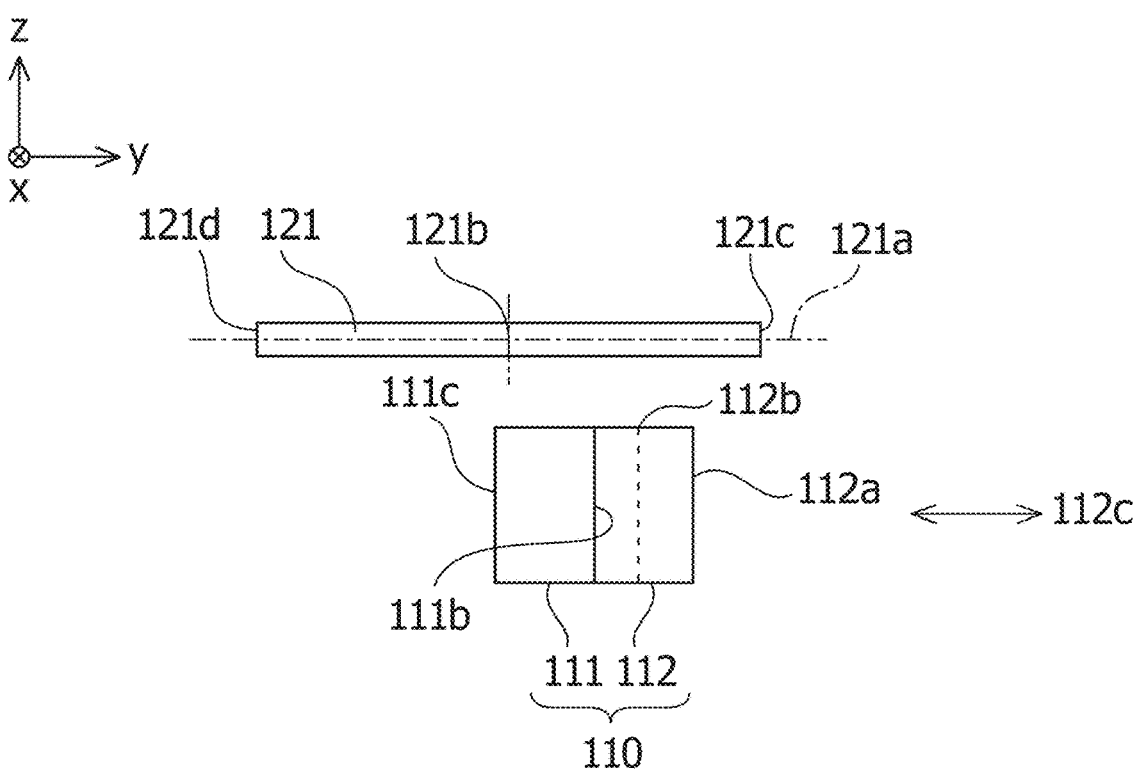
FIG. 2A is an explanatory view showing a magnetic wire and a moving body.

As shown in FIG. 2A, when the moving body 110 linearly moves, a central portion 112b of each of the magnets 112 passes through a place below a region between an axial-direction central portion 121b and an axial-direction first end portion 121c of the magnetic wire 121. The soft magnetic body portion 111 exists in a position that obstructs a place between an axial-direction second end portion 121d of the magnetic wire 121 and the magnets 112 (a position that fills a magnetic path between the axial-direction second end portion 121d and the magnets 112).

The axial-direction first end portion 121c is an end portion on a side on which the magnets 112 are mounted when seen from the soft magnetic body portion 111. The axial-direction second end portion 121d is an end portion on a side opposite from the side on which the magnets 112 are mounted when seen from the soft magnetic body portion 111.

As above, when the moving body 110 linearly moves, the magnets 112 pass through a place below the axial-direction first end portion 121c of the magnetic wire 121, but do not pass through a place below the axial-direction second end portion 121d.

When the moving body 110 reciprocally moves along the longitudinal direction 111a of the soft magnetic body portion 111, an output signal is induced in the coil 122. In other words, the detector 100 is a linear-type detector.

The positional relationship between the magnetic wire 121 and the moving body 110 is described in further detail.

Figure 2B:
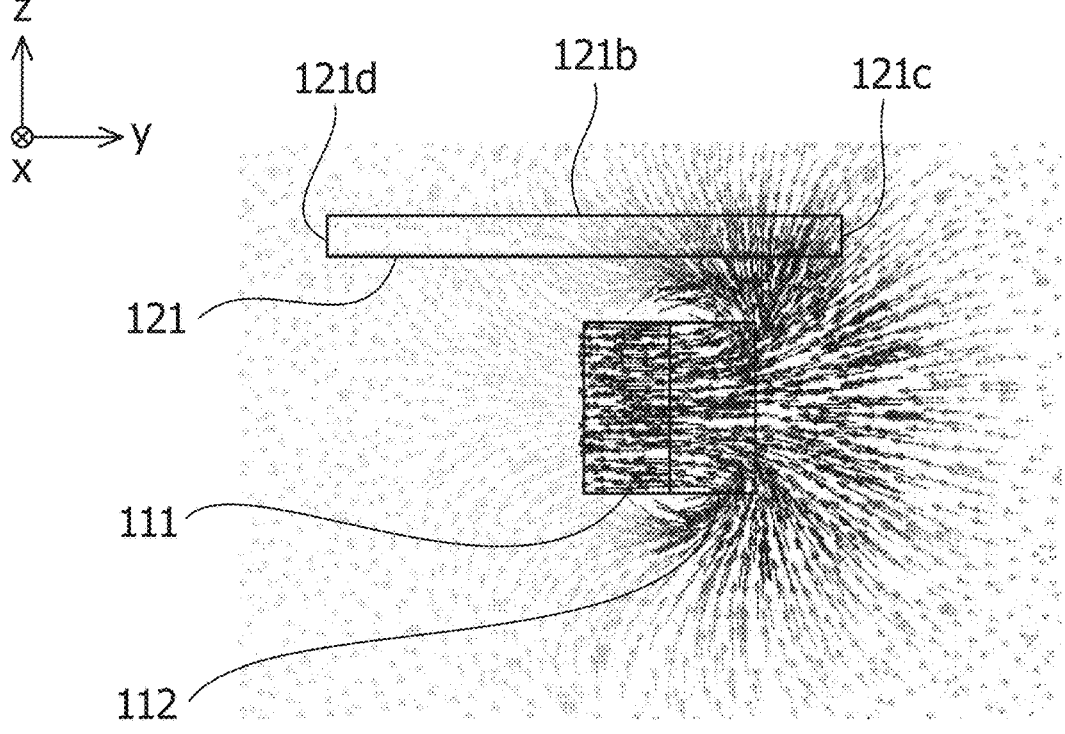
FIG. 2B is a magnetic simulation diagram.

FIG. 2B shows a magnetic simulation result obtained by the magnetic wire 121 and each of the soft magnetic body portion 111 and the magnets 112. A magnetic field is applied in a concentrated manner to the axial-direction first end portion 121c of the magnetic wire 121 facing the magnets 112 by a magnetic concentration effect and a shielding effect of the soft magnetic body portion 111. When the magnetic field is locally applied to the axial-direction first end portion 121c, a reverse magnetic field is propagated toward the axial-direction second end portion 121d from the axial-direction first end portion 121c in the magnetic wire 121, and a single magnetic domain is formed in the entire magnetic wire.

Figure 2C:
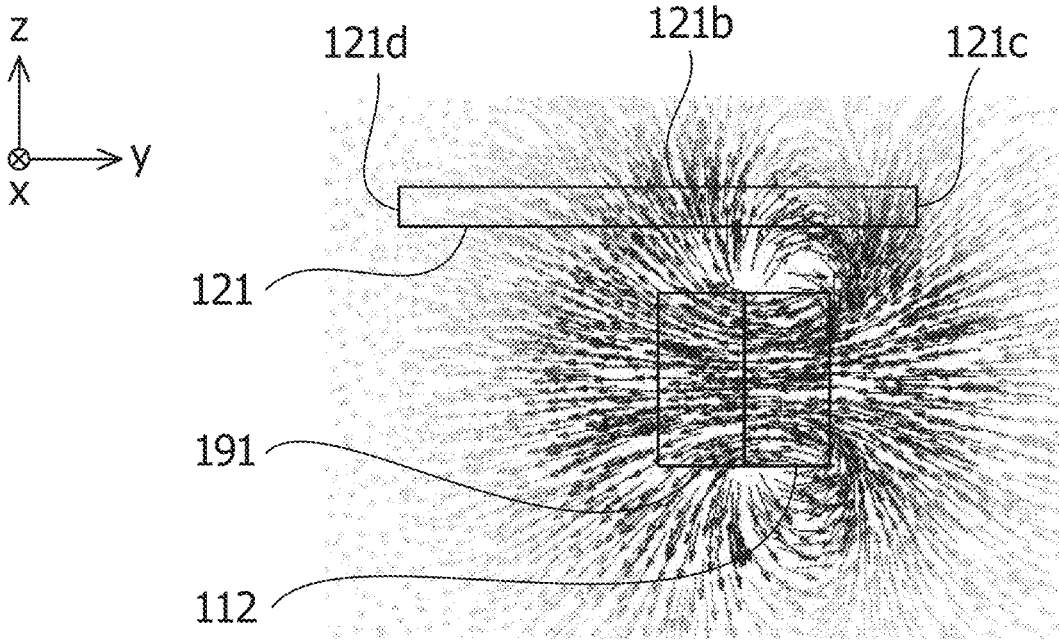
FIG. 2C is another magnetic simulation diagram.

On the other hand, FIG. 2C shows a magnetic simulation result obtained by the magnetic wire 121 and each of the non-magnetic body portion 191 provided in place of the soft magnetic body portion 111 and the magnets 112. Unlike FIG. 2B, a magnetic field is also applied to the axial-direction central portion 121b in addition to the axial-direction first end portion 121c. Therefore, a single magnetic domain is barely formed across the entire magnetic wire.

Figure 2D:
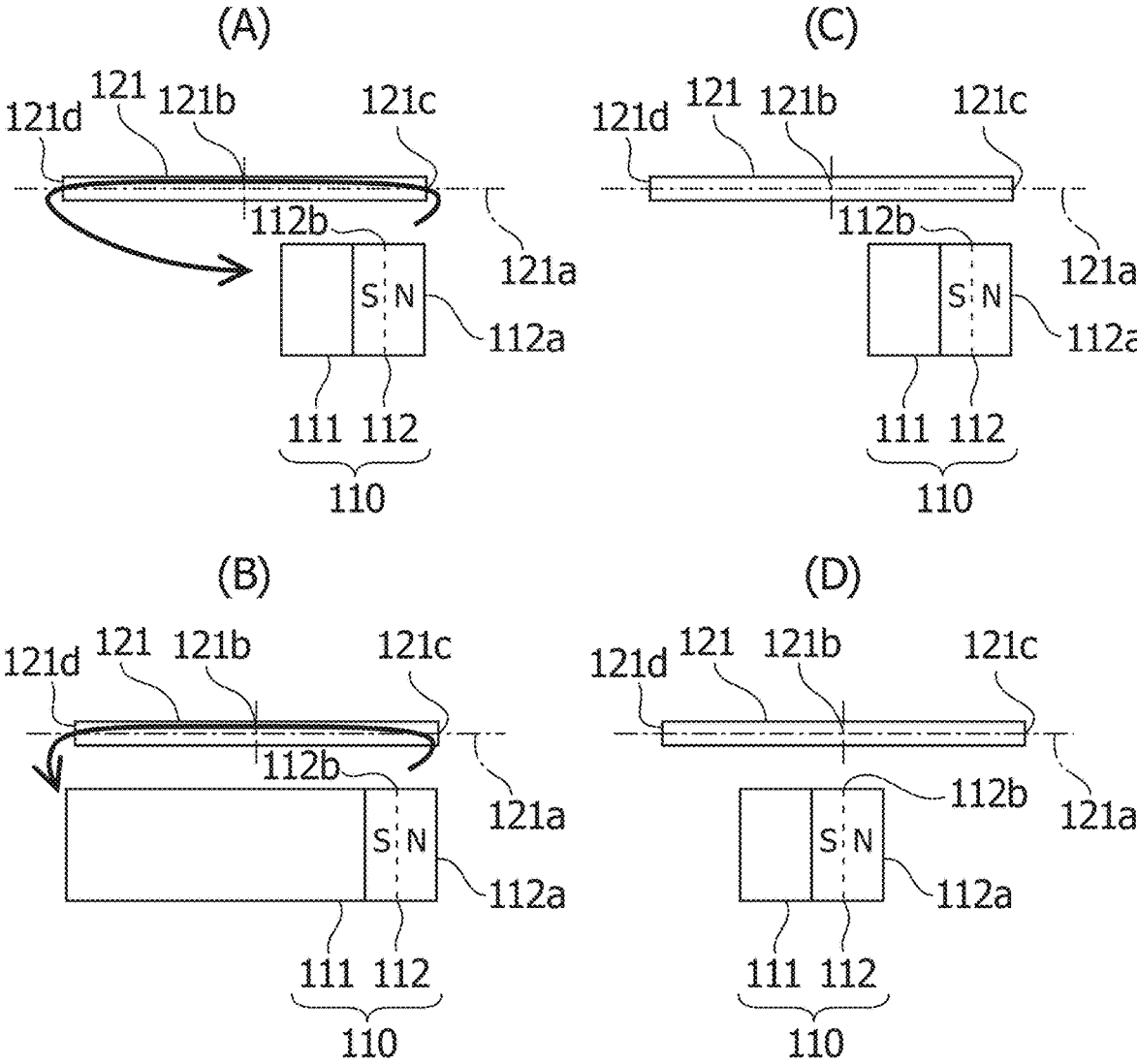
FIG. 2D(A) to FIG. 2D(D) are all explanatory views showing positional relationships between the magnetic wire and the moving body.

By the magnetic wire 121, the magnets 112, and the soft magnetic body portion 111, a magnetic circuit as that indicated by an arrow in FIG. 2D(A) is configured. Therefore, a stabilizing magnetic field is applied to the magnetic wire in the same manner as applying a magnetic field to the entire magnetic wire and in a wider range than a related-art approach in which a magnetic field is applied to one end portion of the magnetic wire. Therefore, a single magnetic domain is formed in the entire magnetic wire, and a high-output pulse signal is obtained.

As shown in FIG. 2D(B), a width of the soft magnetic body portion 111 may be widened in a direction (y-axis negative direction) opposite from the magnets 112, and y-axis positions of a width-direction second end surface 111c of the soft magnetic body portion 111 and the axial-direction second end portion 121d may be set to be substantially the same. In this case, magnetic resistance of the magnetic circuit becomes even smaller, the applied magnetic field is propagated to the entire axis more easily, and the output of the pulse signal is further increased.

As shown in FIG. 2D(C), y-axis positions of end surfaces of the axial-direction first end portion 121c of the magnetic wire 121 and the outer magnetic pole 112a of the magnets 112 may roughly match each other. Alternatively, as shown in FIG. 2D(D), y-axis positions of the axial-direction central portion 121b of the magnetic wire 121 and the central portion 112b of the magnets 112 may roughly match each other. In both of FIG. 2D(C) and FIG. 2D(D), a magnetic circuit similar to that in FIG. 2D(A) and FIG. 2D(B) is formed.

As above, when the magnets 112 approach the magnetic wire 121, at least one part of a place from the axial-direction central portion 121b to the axial-direction first end portion 121c of the magnetic wire 121 faces the central portion 112b of each of the magnets 112, and at least a part of a place from the at least one part to the axial-direction second end portion 121d of the magnetic wire 121 faces the soft magnetic body portion 111.

In other words, a size of the magnet 112 along the width direction of the soft magnetic body 111 only needs to be equal to or less than half a length of the magnetic wire 121 in the axial direction. By choosing a material of the magnets 112, as appropriate, the magnets 112 can be reduced to a size by which a stabilizing magnetic field can be applied to the magnetic wire 121, and an installation tolerance range of the magnets 112 along the y-axis direction can be broadened. A magnetic field is applied to the magnetic wire 121 from a side surface (a surface facing the magnetic wire 121) of the magnet 112. Therefore, by adjusting a distance between the magnetic wire 121 and the magnet 112 at the time of passing through, a strength of the magnetic field applied to the magnetic wire 121 can be easily adjusted. As a result, a pulse signal having stability is provided.

The magnets 112 that are the magnetic-field generation sources formed by a plurality of pairs of NS poles are disposed on the far side and the near side on the plane of the paper in FIG. 2B and FIG. 2C. The influence of a magnetic interference that occurs between adjacent magnets on the magnetic wire 121 is also alleviated by the magnetic concentration effect by the soft magnetic body portion 111 and by applying a magnetic field to the axial-direction first end portion 121c of the magnetic wire 121. Therefore, it becomes possible to place adjacent magnetic-field generation sources close to each other and enhance the density in the number of poles of the magnets. In other words, the detector 100 is downsized.

By applying a magnetic field to one axial-direction end portion of the magnetic wire 121, the degree of freedom in arrangement becomes higher because magnetic fields with equal strengths do not necessarily need to be applied to both ends of the both axial-direction end portions of the magnetic wire or the entire magnetic wire. A detector that is a hollow-type, a shaft-type a radial-gap-type, an axial-gap-type rotary-type, or the like can be obtained by changing a shape of the soft magnetic body portion to a ring-like shape or a disk-like shape. Those various forms are described below.

Second Embodiment

Figure 3A:
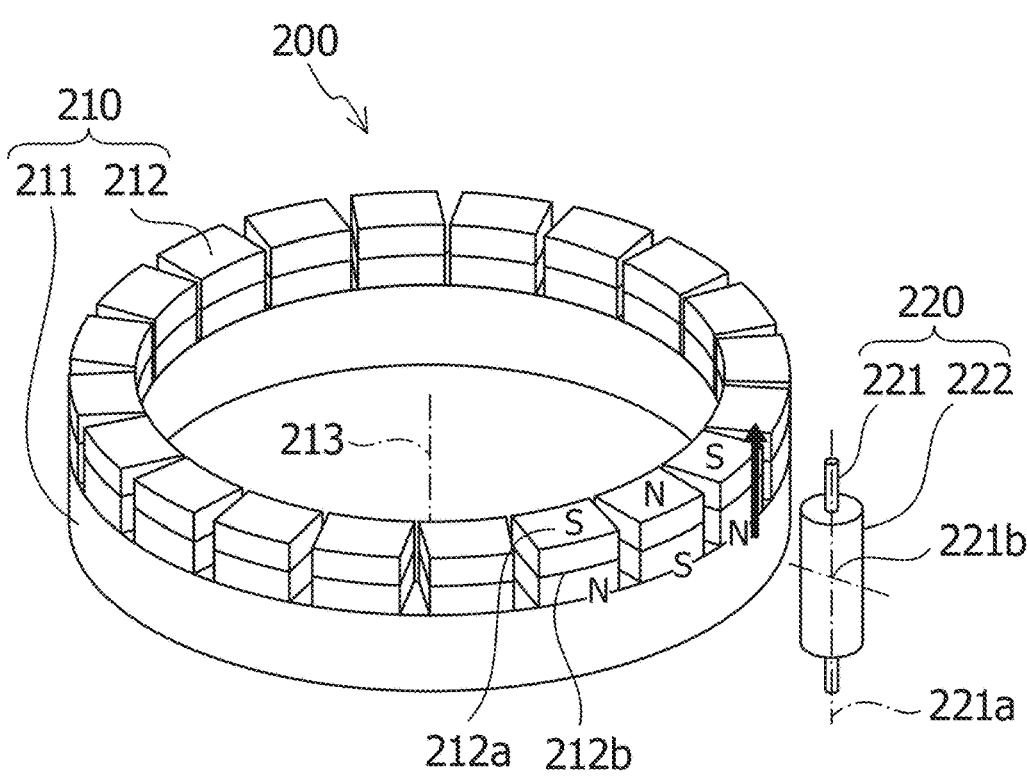
FIG. 3A is a perspective view of a rotary-type detector based on a second embodiment.
Figure 3B:
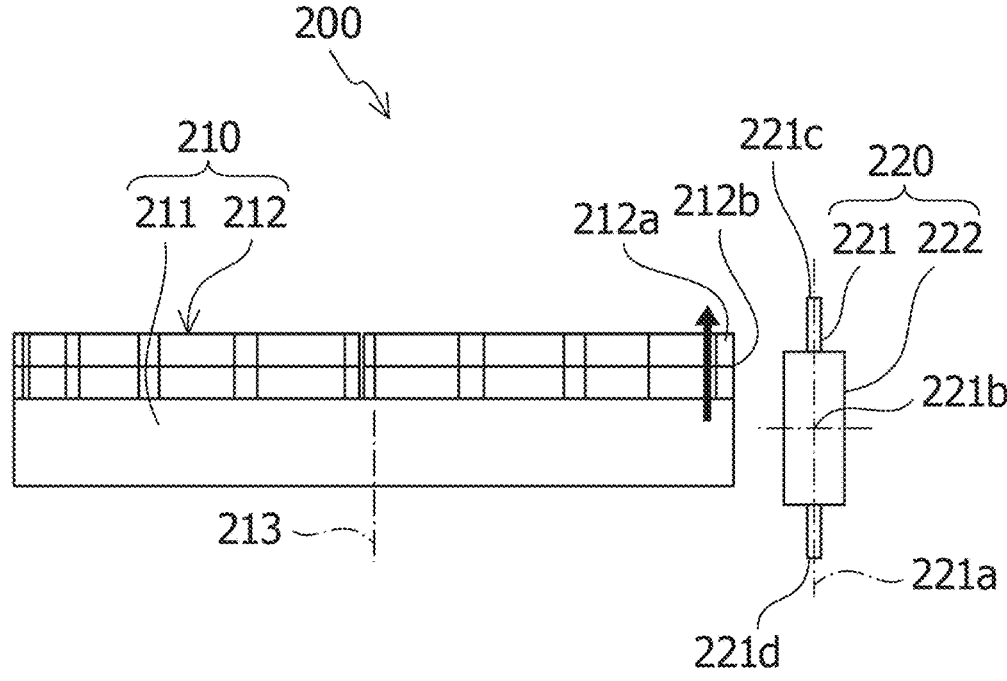
FIG. 3B is a side view of the rotary-type detector based on the second embodiment.

A detector 200 based on a second embodiment is shown in FIG. 3A and FIG. 3B. The detector 200 includes a moving body 210 that rotationally moves and one power generation sensor 220.

The moving body 210 includes a ring-like soft magnetic body portion 211 and a plurality of magnets 212. The plurality of magnets 212 are fixed by being arranged in a circumferential direction on one axial-direction end surface of the soft magnetic body portion 211. The magnets 212 are each magnetized in an axial direction (the up-down direction on the plane of the paper of FIG. 3B) of the soft magnetic body portion 211 and each have a pair formed by an N-pole and an S-pole. The magnet 212 has an outer magnetic pole 212a on an axial-direction upper side of the soft magnetic body portion 211. The plurality of magnets 212 are disposed such that adjacent outer magnetic poles 212a are heteropolar. The moving body 210 rotates about an axis 213 of the soft magnetic body portion 211 extending in an up-down direction as a rotational axis.

The power generation sensor 220 is disposed on a radial-direction outer side of the moving body 210 and has a magnetic wire 221 in which a large Barkhausen phenomenon occurs and a coil 222 wound around the magnetic wire 221. The magnetic wire 221 is disposed in parallel to the rotational axis 213.

The plurality of magnets 212 pass through a vicinity of the power generation sensor 220 by rotation motion of the moving body 210. A direction of motion of the magnets 212 when the magnets 212 approach the magnetic wire 221 is perpendicular to an axial direction 221a of the magnetic wire 221. When the magnets 212 approach the magnetic wire 221, at least one part of a place from an axial-direction central portion 221b to an axial-direction upper end portion 221c of the magnetic wire 221 faces central portions 212b of the magnets 212. At this time, at least a part of a place from the at least one part to an axial-direction lower end portion 221d of the magnetic wire 221 faces the soft magnetic body portion 211. The soft magnetic body portion 211 exists in a position that obstructs a place between the axial-direction lower end portion 221d of the magnetic wire 221 and the passing magnets 212 (a position that fills a magnetic path).

When 20 magnets 212 are provided at even intervals along the circumferential direction of the soft magnetic body portion 211, a positive pulse signal is induced ten times and a negative pulse signal is induced ten times in the coil 222 for one forward rotation of the moving body 210. A positive pulse signal is induced ten times and a negative pulse signal is induced ten times for one reverse rotation of the moving body 210.

As above, the detector 200 has the hollow-type moving body 210 and is a radial-gap-type detector. The detector 200 is a thin because an axial-direction thickness of the moving body 210 fits in a thickness equal to or less than a length of the magnetic wire 221. The power generation sensor 220 is positioned on the radial-direction outer side of the moving body 210, and hence a hollow portion of the hollow-type detector 200 can be set to be large.

First Modified Example of Second Embodiment

Figure 4A:
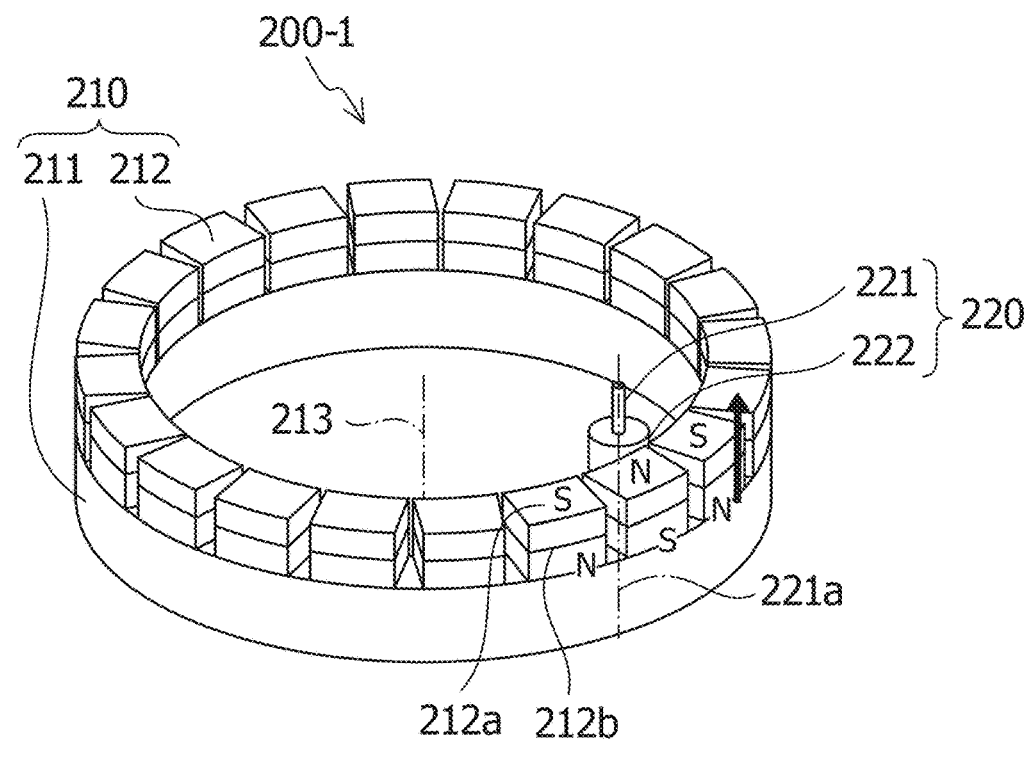
FIG. 4A is a perspective view of a rotary-type detector based on a first modified example of the second embodiment.

In a detector 200-1 shown in FIG. 4A, the power generation sensor 220 is disposed on a radial-direction inner side of the moving body 210 to be spaced apart from the rotational axis 213. In this case, an outer diameter of the detector can be set to be small.

Second Modified Example of Second Embodiment

Figure 4B:
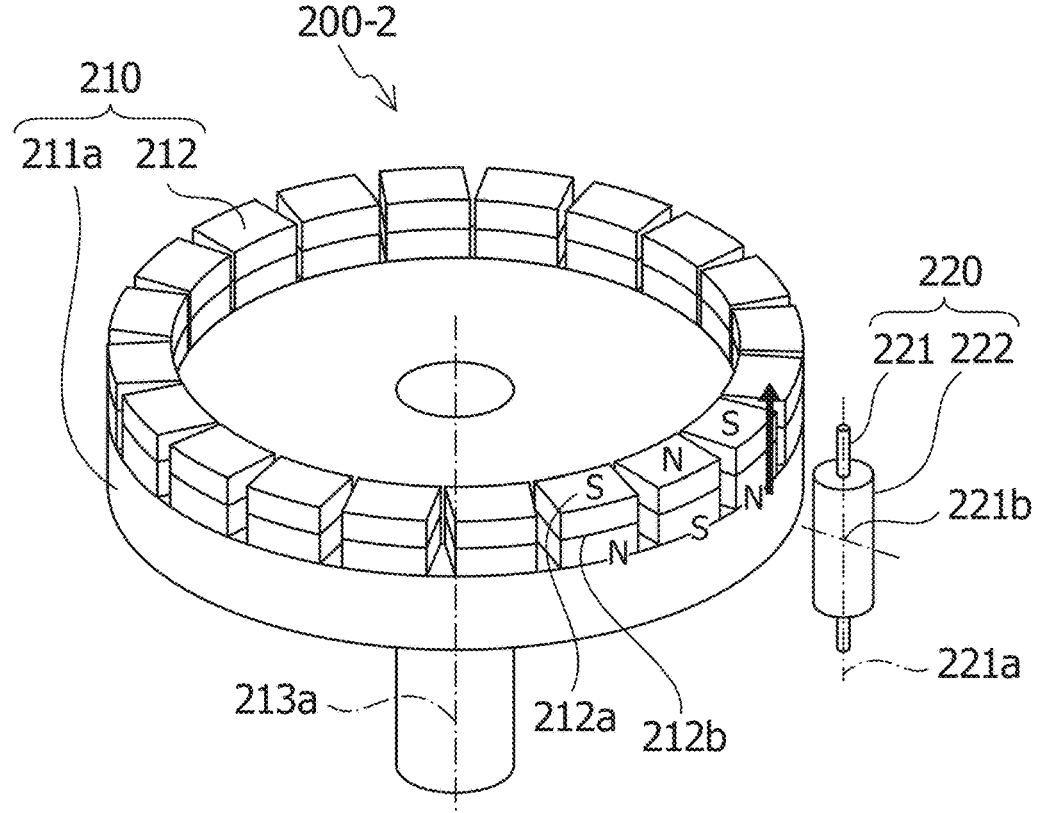
FIG. 4B is a perspective view of a rotary-type detector based on a second modified example of the second embodiment.

As shown in FIG. 4B, a detector 200-2 includes a substantially disk-like soft magnetic body portion 211a instead of the ring-like soft magnetic body portion 211 shown in FIG. 3A. The plurality of magnets 212 are disposed on an outer edge portion of the soft magnetic body portion 211a. A shaft 213a is mounted on an axial-direction lower end surface of the soft magnetic body portion 211a. As above, the moving body 210 can be a shaft-type. A material of the shaft 213a may be a non-magnetic body or a magnetic body.

Figure 4C:
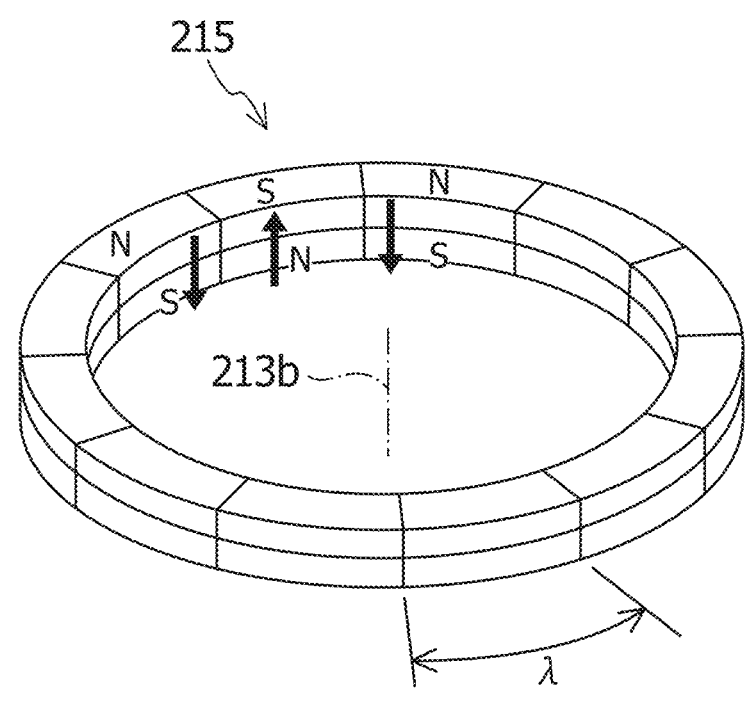
FIG. 4C is a perspective view of a multipolar-magnetized magnet according to a modified example of the second embodiment.

The plurality of magnetic field generation sources can also be multipolar-magnetized magnets. As shown in FIG. 4C, when an upper surface and a lower surface of a ring-like hard magnetic body portion 215 are simultaneously magnetized by a magnetizing yoke having an area equivalent to a predetermined magnetizing pitch $\lambda$, magnetization is performed in a direction of a rotational axis 213b, and magnetic poles appear in the upper surface and the lower surface of the hard magnetic body portion 215. The magnet obtained by being multipolar-magnetized as above only need to be fixed to the ring-like soft magnetic body portion 211 or the disk-like soft magnetic body portion 211a. Application to the first embodiment also becomes possible by causing a shape of the hard magnetic body portion to be elongated.

Third Embodiment

Figure 5A:
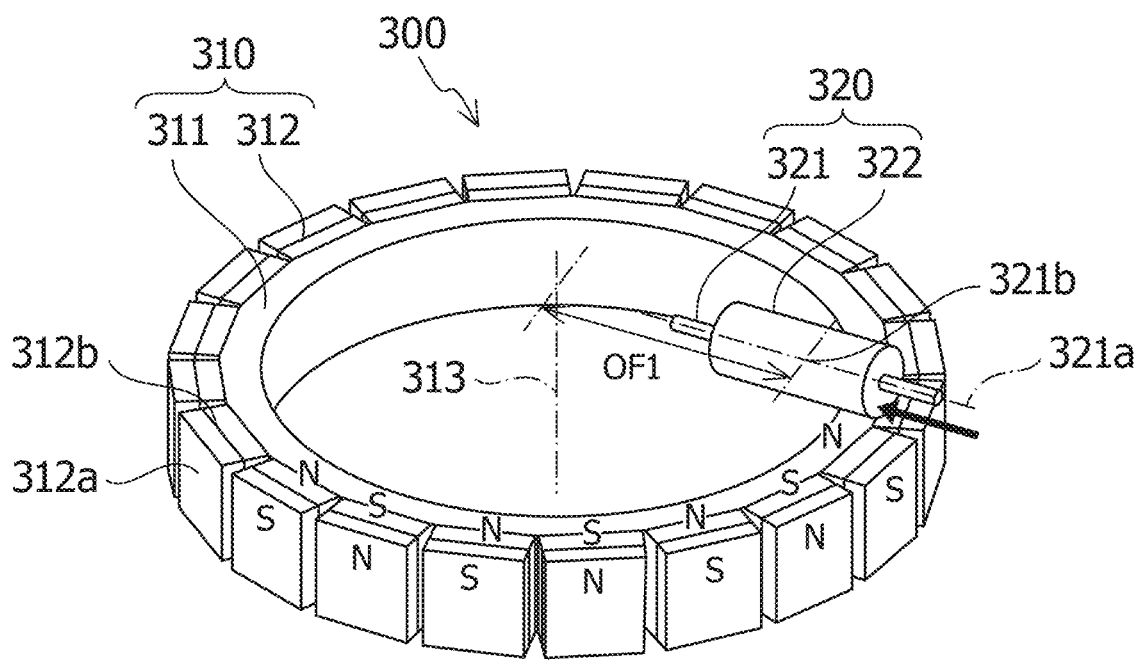
FIG. 5A is a perspective view of a rotary-type detector based on a third embodiment.

FIG. 5A shows a detector 300 according to a third embodiment. Unlike the second embodiment (FIG. 3A), the plurality of magnets 312 are fixed on an outer circumferential surface of a ring-like soft magnetic body portion 311 at even intervals in a circumferential direction. A power generation sensor 320 is disposed to be orthogonal to a rotational axis 313, and an axial direction 321a of a magnetic wire 321 is parallel to a normal direction. A length-direction central position 321b of the magnetic wire 321 is offset from the rotational axis 313. An offset amount is indicated by reference character OF1.

Figure 5B:
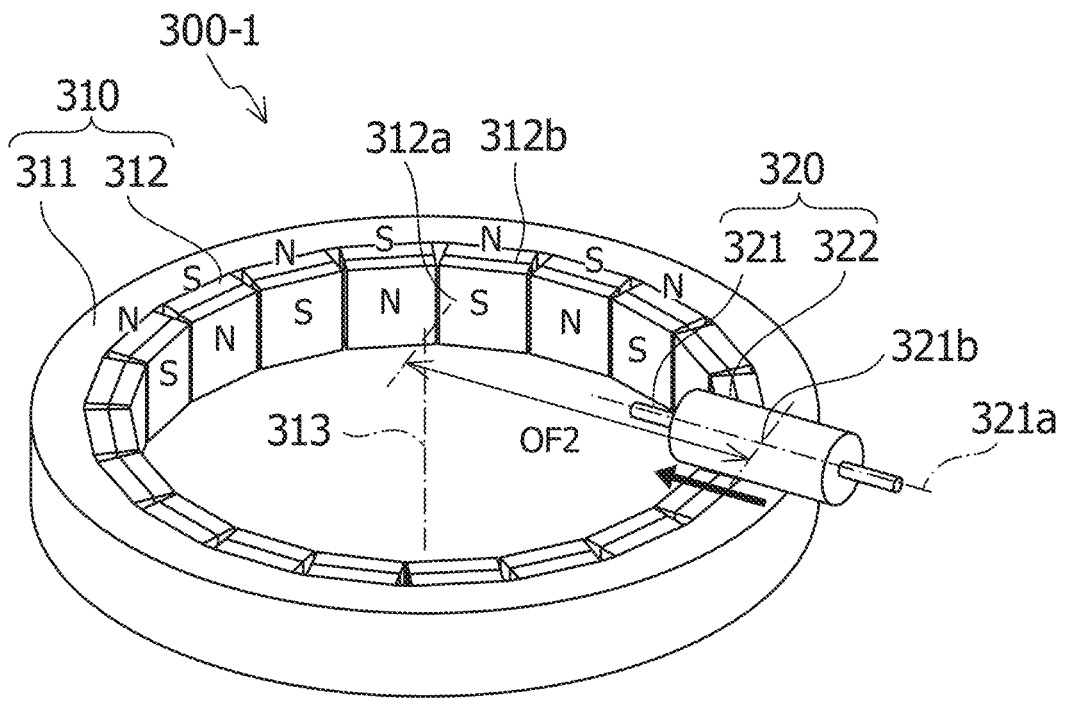
FIG. 5B is a perspective view of a rotary-type detector based on a first modified example of the third embodiment.

Alternatively, as shown in FIG. 5B, the plurality of magnets 312 may be fixed to an inner circumferential surface of the soft magnetic body portion 311. An offset amount between the length-direction central position 321b of the magnetic wire 321 and the rotational axis 313 in this case is indicated by reference character OF2.

As above, two types of hollow-type axial-gap-type detectors positions of the power generation sensor 320 of which are different are obtained. In either case, the power generation sensor can be horizontally placed on a board (not shown) on which electronic components configuring a detection circuit are mounted, and the stability of mounting is high.

Modified Example of Third Embodiment

Figure 6:
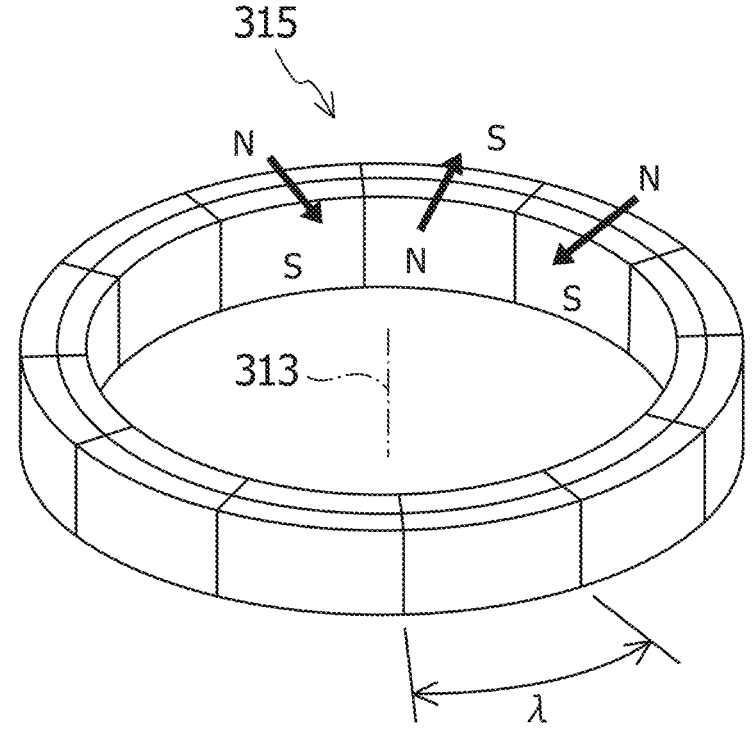
FIG. 6 is a perspective view of a multipolar-magnetized magnet according to a modified example of the third embodiment.

As with the modified example of the second embodiment, a plurality of magnetic-field generation sources can be multipolar-magnetized magnets. As shown in FIG. 6, when an outer circumferential surface and an inner circumferential surface of the ring-like hard magnetic body portion 315 are simultaneously magnetized by a magnetizing yoke having an area equivalent to a predetermined magnetizing pitch 2, magnetization is performed along the direction of the rotational axis 313, and magnetic poles appear in the outer circumferential surface and the inner circumferential surface of the hard magnetic body portion 315. The magnets obtained by being multipolar-magnetized as above only need to be fixed to the soft magnetic body portion 311.

Figure 7A:
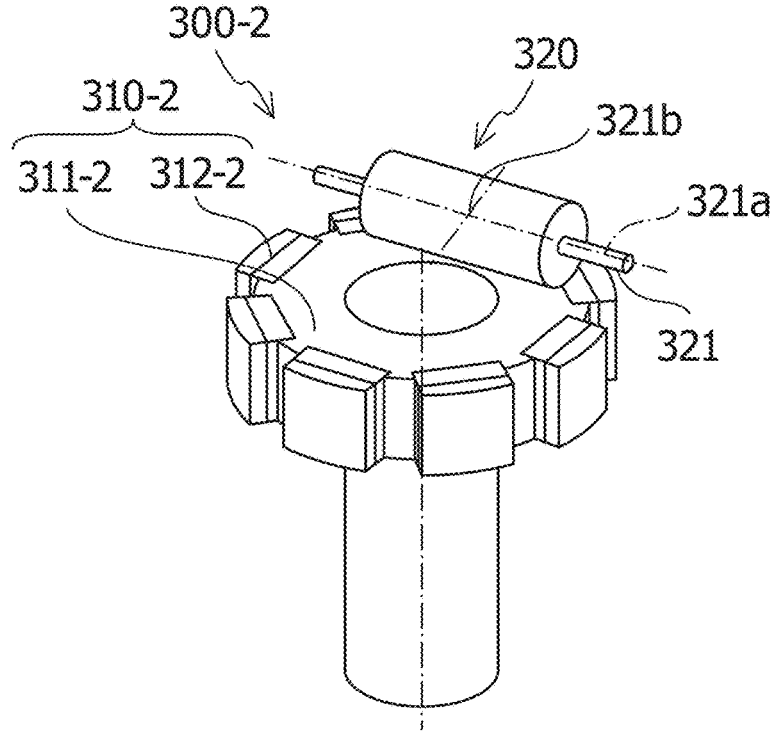
FIG. 7A is a perspective view of a rotary-type detector based on a second modified example of the third embodiment.
Figure 7B:
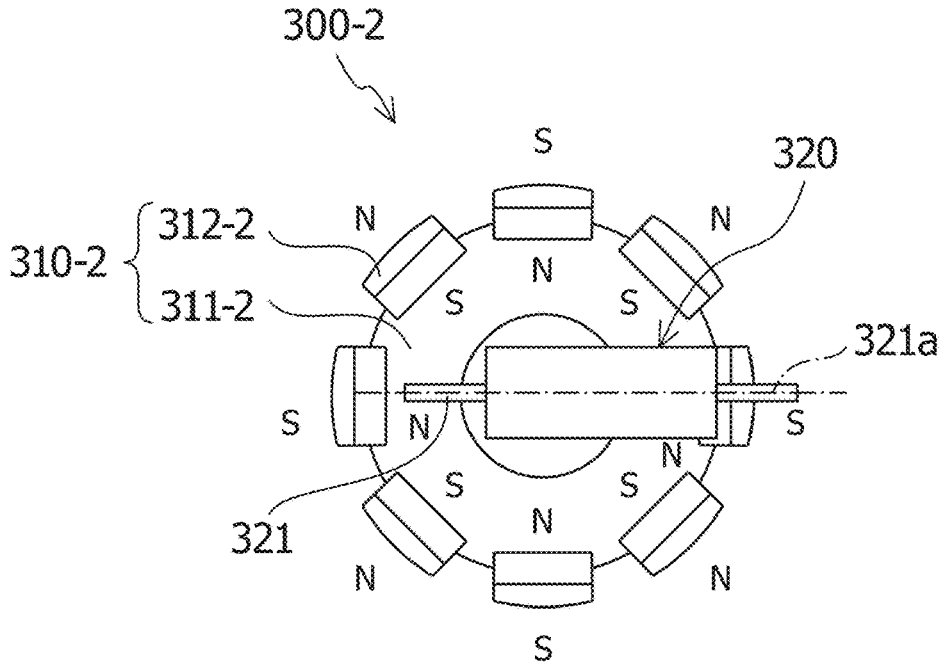
FIG. 7B is an upper view of the rotary-type detector based on the second modified example of the third embodiment.

FIG. 7A and FIG. 7B show a detector 300-2 according to another modified example. An outer diameter of a moving body 310-2 is small and is similar to the length of the magnetic wire 321. In the moving body 310-2, eight magnets 312-2 are disposed on an outer circumferential surface of a disk-like soft magnetic body portion 311-2. The magnetic wire 321 intersects with a rotational axis of the moving body 310-2. The magnetic wire 321 of the power generation sensor 320 has one end portion 321a facing an outer circumferential portion of the soft magnetic body portion 311-2 in the axial direction and another end portion facing an inner circumferential portion of the soft magnetic body portion 311-2 in the axial direction.

According to this structure, in two magnets 312-2 facing each other in the radial direction, two magnetic poles on the radial-direction inner side are homopolar, but a magnetic field is applied to the magnetic wire 321 by only one magnetic pole. Therefore, a large Barkhausen phenomenon can occur in the magnetic wire 321. According to this form, a multi-period alternating magnetic field periods of which are not limited can be applied to the magnetic wire, and a high-output signal having stability is induced in the coil wound around the magnetic wire. A radial-direction dimension is also downsized.

Description of Multi-Rotation Function

Next, a detector having a multi-rotation detection function is described. The power generation sensor is used in coarse detection for one rotation unit at the time of power shutdown. For accurate position detection at the time of power activation, a detector for an absolute angle within one rotation is used. The power generation sensor outputs a total of two pulses, in other words, one positive pulse and one negative pulse for one period of an alternating magnetic field. However, it cannot be determined whether the rotation is forward rotation or reverse rotation with only this pulse. Thus, the following methods have hitherto been used.

1) A method of obtaining a phase difference signal by increasing the number of the power generation sensors
2) A method of adding other detection means The former needs a plurality of the power generation sensors. The latter can be achieved by one power generation sensor and an additional sensor element as described in Patent Document 2.

When a single power generation sensor is used, a stabilizing magnetic field and an operating magnetic field need to be applied to the magnetic wire in a determined order to obtain a pulse signal at a sufficient level. When the rotating body reversely rotates immediately after a pulse signal is output as a result of an operating magnetic field being applied to the magnetic wire at the time of the forward rotation of the rotating body, one turn of a pulse signal necessary for rotation detection is not obtained because the order described above is not followed. In this case, an error exceeds ±180 degrees, and rotation amount detection cannot be correctly performed.

It has hitherto been difficult to balance both the acquisition of a multi-period alternating magnetic field and the downsizing of the detector. However, as a modification of a form shown in FIG. 7A and FIG. 7B, the number of the magnetic-field generation sources can be four, and an alternating magnetic field of two periods for one rotation can be applied to the magnetic wire. In other words, a detector that includes a multi-rotation detection function, is small in size, is low in cost, and is stable in terms of an output of a pulse signal can be obtained. The form is described in detail below.

Fourth Embodiment

Figure 8A:
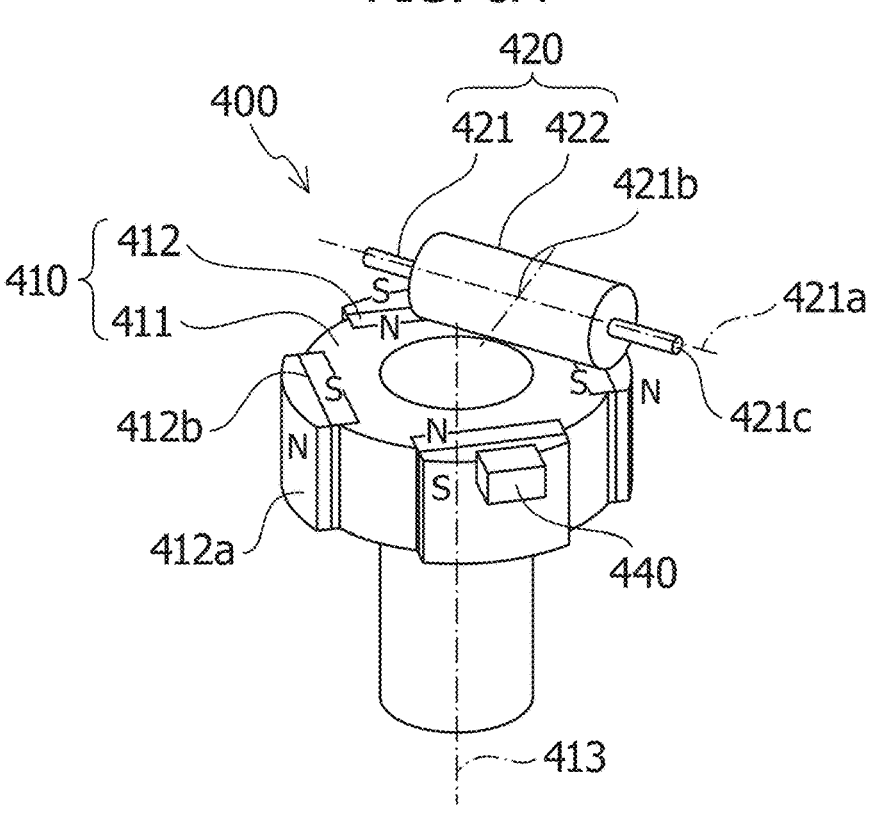
FIG. 8A is a perspective view of a rotary-type detector based on a fourth embodiment.
Figure 8B:
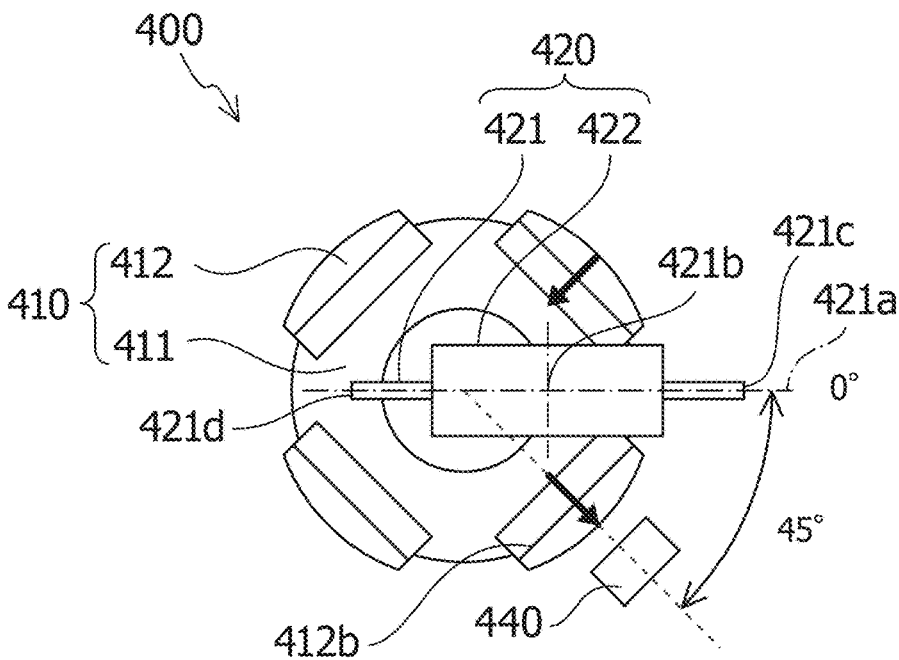
FIG. 8B is an upper view of the rotary-type detector based on the fourth embodiment.

FIG. 8A and FIG. 8B show a detector 400 having a multi-rotation detection function based on a fourth embodiment. The detector 400 includes a moving body 410 that rotates and a single power generation sensor 420.

The moving body 410 has a disk-like soft magnetic body portion 411 and four magnets 412 serving as magnetic-field generation sources. The four magnets 412 are disposed on an outer circumferential surface of the soft magnetic body portion 411 at even intervals in a circumferential direction. The magnets 412 are each magnetized in a radial direction of the soft magnetic body portion 411 and each have a pair formed by an N-pole and an S-pole. The magnet 412 has an outer magnetic pole 412a on a radial-direction outer side of the soft magnetic body portion 411. The four magnets 412 are disposed such that outer magnetic poles 412a adjacent to each other in the circumferential direction are heteropolar.

The power generation sensor 420 has a magnetic wire 421 in which a large Barkhausen phenomenon occurs, and a coil 422 wound around the magnetic wire 421. The magnetic wire 421 is orthogonal to a rotational axis 413, and an axial direction 421a of the magnetic wire 421 is parallel to a normal direction.

By rotation motion of the moving body 410, the four magnets 412 pass through a vicinity of an axial-direction first end portion of the magnetic wire 421. A direction of motion of the magnets 412 when the magnets 412 pass through the vicinity is perpendicular to the axial direction 421a of the magnetic wire 421. A central portion 412b of each of the magnets 412 passes through a place below a region between an axial-direction central portion 421b and the axial-direction first end portion 421c of the magnetic wire 421. The soft magnetic body portion 411 does not face the axial-direction first end portion 421c of the magnetic wire 421 in the axial direction but faces an axial-direction second end portion 421d.

By the structure above, two periods of a uniform alternating magnetic field are applied to the magnetic wire 421 when the moving body 410 rotates one time.

The detector 400 further includes one magnetic sensor 440. The magnetic sensor 440 is disposed in a position in which a magnetic field from the magnetic-field generation source can be determined when the power generation sensor 420 outputs a pulse signal.

When a certain magnet (referred to as a "first magnet") out of the four magnets 412 passes through the vicinity of the magnetic wire 421, a stabilizing magnetic field is applied to the magnetic wire 412. Next, when a second magnet adjacent to the first magnet approaches the magnetic wire 412, an operating magnetic field in a direction opposite from the stabilizing magnetic field described above is applied to the magnetic wire 412, and the power generation sensor 420 outputs a pulse signal.

In other words, as shown in FIG. 8B, the magnetic sensor 440 is disposed to form a predetermined angle with the axial-direction first end portion 421c about the rotational axis 413. This predetermined angle is about 45 degrees as shown in FIG. 8B. Alternatively, the predetermined angle may be about 135 degrees, about 225 degrees, or about 315 degrees.

Method of Determining Number of Rotations and Rotation Direction

Figure 9A:
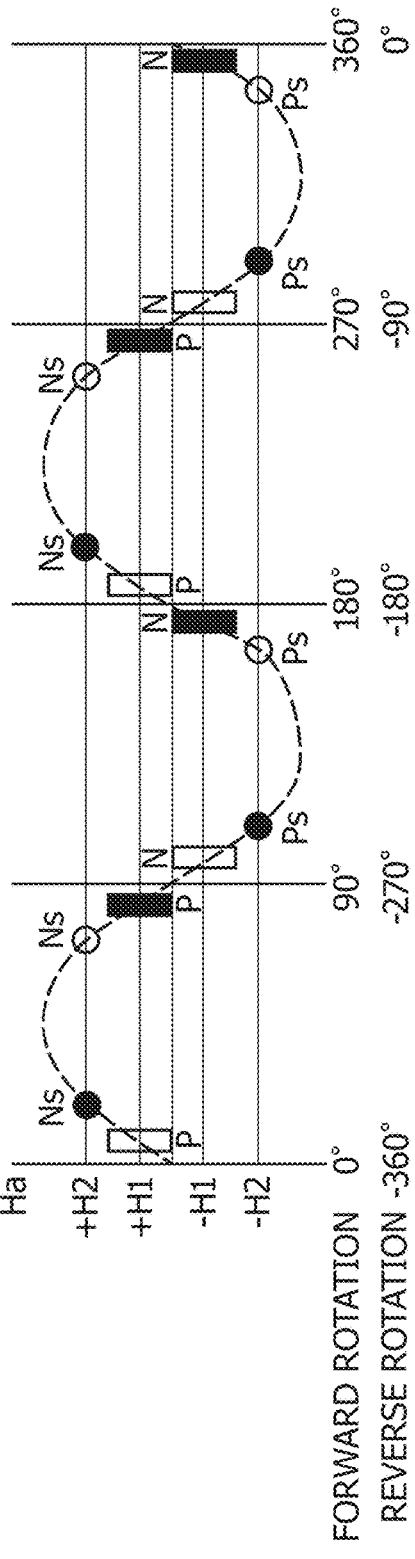
FIG. 9A is an explanatory view showing magnetic fields applied to a power generation sensor according to the fourth embodiment, and output signals.

In FIG. 8B, right rotation of the moving body 410 is the forward rotation, and left rotation thereof is the reverse rotation. A magnetic field Ha applied to the power generation sensor 420 at the time of rotation is shown in FIG. 9A. A positive pulse signal generated in the power generation sensor 420 at the time of the forward rotation is indicated by reference character P, a stabilizing magnetic field serving as the basis of the output of the signal P is indicated by reference character Ps, a negative pulse signal is indicated by reference character N, and a stabilizing magnetic field serving as the basis of the output of the signal N is indicated by reference character Ns. The stabilizing magnetic field is ±H2, and the operating magnetic field is ±H1. The output at the time of the reverse rotation is indicated by the same reference character as that at the time of the forward rotation, but the reference character at the time of the forward rotation is indicated by being colored in white and the reference character at the time of the reverse rotation is indicated by being colored in black.

The magnetic field applied from the permanent magnet 412 to the power generation sensor 420 is an alternating magnetic field of two periods for one rotation. Therefore, the power generation sensor 420 outputs the positive and negative (P, N) signals two times for one forward rotation, and outputs the positive and negative (P, N) signals two times for one reverse rotation as with the time of the forward rotation.

Figure 9B:
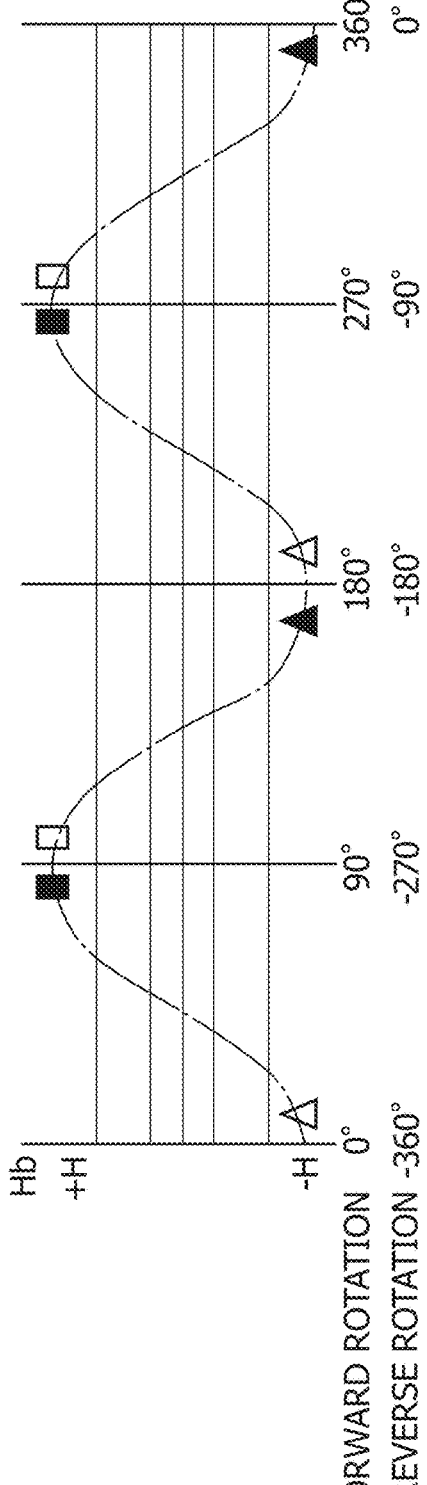
FIG. 9B is an explanatory view showing magnetic fields applied to a magnetic sensor according to the fourth embodiment, and output signals.

In FIG. 9B, a magnetic field Hb applied to the magnetic sensor 440 is indicated by a one-dot chain line. As described above, the magnetic sensor 440 is disposed so as to form an angle of about 45 degrees with the axial-direction first end portion 421c about the rotational axis 413. Therefore, the alternating magnetic field Hb is shifted from the alternating magnetic field Ha shown in FIG. 9A by a phase of 45 degrees. As the magnetic sensor 440, a magnetic sensor that can determine NS poles (plus and minus in the drawing) such as a Hall element and a magneto-resistive element (SV-GMR, TMR) can be used. In this case, when two P-signals of the forward rotation and two N-signals of the reverse rotation are output from the power generation sensor 420, a signal indicating that a minus magnetic field has been detected is output from the magnetic sensor 440. The above is indicated by triangular shapes colored in white and black in the drawing. When two N-signals of the forward rotation and two P-signals of the reverse rotation are output from the power generation sensor 420, a signal indicating that a plus magnetic field has been detected is output from the magnetic sensor 440. The above is indicated by quadrilateral shapes colored in white and black in the drawing.

Figure 9C:
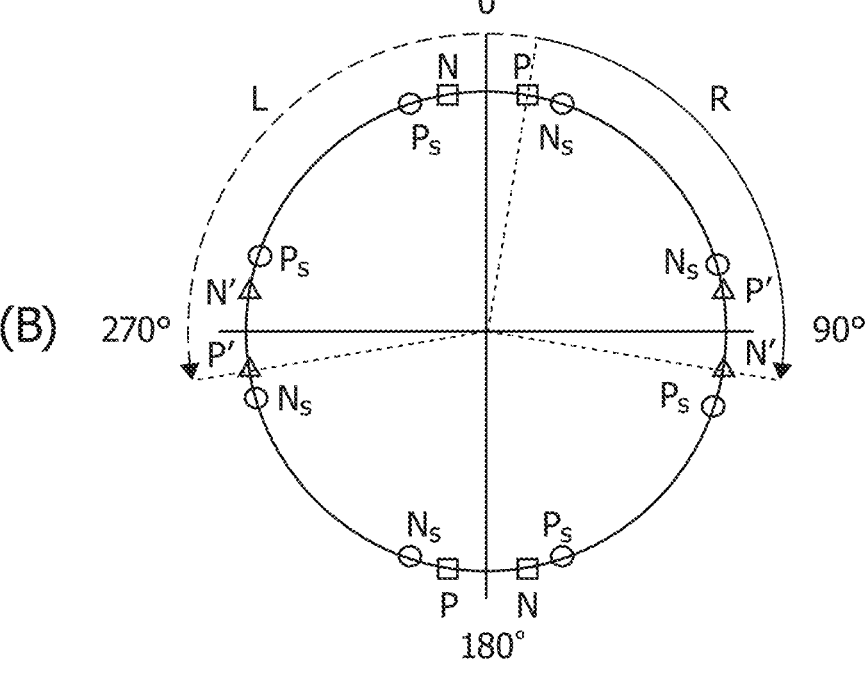
FIG. 9C(A) is an explanatory view showing combinations of a detection result of the power generation sensor and a detection result of the magnetic sensor according to the fourth embodiment.

FIG. 9C(A) shows combinations of an output signal of the power generation sensor 420 and a detection signal of the magnetic sensor 440.

FIG. 9C(B) shows rotational coordinates. A rotation angle from when a positive pulse signal P is output to when the moving body 410 rotates to the right as indicated by reference character R and a next signal N' is detected is +90 degrees. On the other hand, when the moving body 410 rotates to the left as indicated by reference character L immediately after the positive pulse signal P is output, the next signal is expected to be a signal N. However, the stabilizing magnetic field Ns is not passed through. Therefore, the signal N is not output or the signal N is extremely small even when the signal N is output, and it becomes difficult to perform evaluation. Therefore, a rotation angle until the next evaluable left rotation signal that is a signal P' can be output is about-(90 degrees+α). As above, even when there is rotation motion in which a stabilizing magnetic field is not applied in either of the forward rotation or the reverse rotation, a range in which the same signal is duplicated is not generated. A range of the positions that can be determined becomes less than 360 degrees, and the number of rotations of the moving body 410 can be accurately detected.

Regarding the method of determining the rotation direction of the moving body 410, a case in which there are two successive signals is described as one example to facilitate understanding.

Figures 9D, 10:
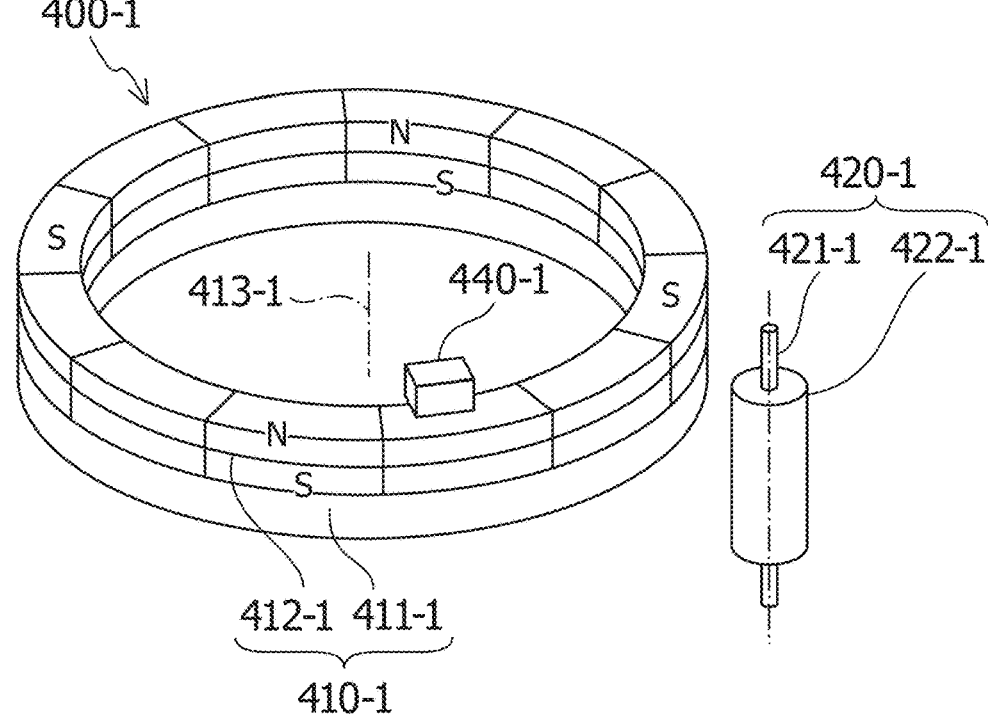
FIG. 9D is an explanatory view showing the number of counts of the output signals based on the fourth embodiment.
FIG. 10 is a perspective view of a rotary-type detector based on a modified example of the fourth embodiment.

The determination is performed by a signal processing circuit (not shown) including a memory. The signal processing circuit has an identification function, a reference function, and a calculation function. First, the signal processing circuit identifies signals from the power generation sensor 420 as any one of four signals, that are, P, P', N, and N' by the identification function. Next, the signal processing circuit successively writes a previous history signal (previous state) stored in an initial state for starting the counting of the number of rotations and the rotation direction and a signal (new state) in accordance with the rotation thereafter into a memory by the reference function. The signal processing circuit searches a preset table obtained by four types of codes for two successive past and current signals stored in the memory, and returns a count value that has matched. One example of the table is shown in FIG. 9D. The signal processing circuit performs a search every time a signal is input, and a count value of a result thereof is sequentially added and subtracted by the calculation function. Numerical values obtained by the addition and subtraction indicate the number of rotations and the rotation direction at that time point. By setting a reference position between the signal N and the signal P and using a table as that shown in FIG. 9D, the rotation direction and the number of rotations of the moving body 410 can be accurately counted.

Method of Synchronizing Positions and Number of Rotations in One Rotation

When the detector is used for multi-rotation of a motor, the number of rotations is detected by a method described above with reference to FIG. 9D during a power suspension of a motor driving system. When the motor driving system is activated, each of the signals P, P', N, and N' exists in two places in one rotation. Thus, it becomes a choice between two regions, and the number of rotations cannot be specified. Therefore, a displacement angle needs to be determined from a reference position of a rotational counter. Thus, a one-rotation absolute-type position sensor is externally mounted. As a result, it can be determined which region the position is in, and the number of rotations can be specified.

Modified Example of Fourth Embodiment

As shown in FIG. 10, as a modified example of the fourth embodiment, the multi-rotation function can also be provided in a hollow type. A detector 400-1 includes a moving body 410-1, a power generation sensor 420-1, and a magnetic sensor 440-1. The moving body 410-1 includes a ring-like soft magnetic body portion 411-1, and four magnets 412-1 fixed on an upper surface of the soft magnetic body portion. Each of the four magnets 412-1 is obtained by magnetizing a ring-like hard magnetic body. The power generation sensor 420-1 includes a magnetic wire 421-1 and a coil 422-1. The magnetic wire 421-1 is disposed in parallel to a rotational axis 413-1 of the moving body 410-1.

Fifth Embodiment

In the fourth embodiment described above, a total of eight signals, that is, four for each of the forward rotation and the reverse rotation of the power generation sensor 420 can be covered by one magnetic sensor 440 in a position spaced apart from the magnetic wire 421 by about 45 degrees in the circumferential direction. This is because the magnetic-field generation sources disposed at even intervals in the circumferential direction are close to each other by a certain degree, and a sufficient magnetic field that can be detected with only the magnetic sensor 440 in both forward rotation and the reverse rotation is applied to the magnetic sensor 440. However, in a hollow type such as that in the first modified example of the fourth embodiment, there may be cases in which the magnetic-field generation sources are not close to each other. A case as above is described below.

Figure 11A:
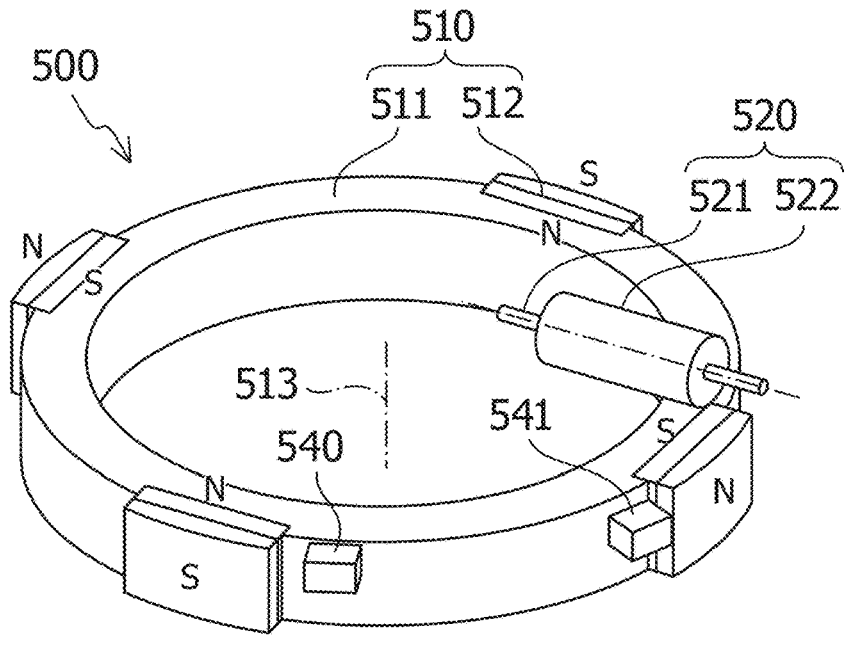
FIG. 11A is a perspective view of a rotary-type detector based on a fifth embodiment.

As shown in FIG. 11A, the detector 500 includes a moving body 510, a power generation sensor 520, a first magnetic sensor 540, and a second magnetic sensor 541. The moving body 510 includes a ring-like soft magnetic body portion 511 and four magnets 512 disposed on an outer circumferential surface of the soft magnetic body portion 511 at even intervals in a circumferential direction. The magnets 512 are not close to each other, unlike in the fourth embodiment (FIG. 8A). The power generation sensor 520 includes a magnetic wire 521 and a coil 522. The power generation sensor 520 is disposed in parallel to a radial direction of the moving body 510 to be offset from a rotational axis 513 of the moving body 510.

The power generation sensor 520 outputs a pulse signal when a certain magnet out of the four magnets 512 passes through a vicinity of the magnetic wire 521, the next magnet comes closer, a reverse magnetic field gradually becomes stronger, and an operating magnetic field is applied. The rotation positions of the moving body 510 when a pulse signal is output are a total of eight positions, that is, the rotation positions at which the power generation sensor 520 outputs a positive pulse signal P and a negative pulse signal N at the time of forward rotation and the positions at which the power generation sensor 520 outputs the positive pulse signal P and the negative pulse signal N at the time of reverse rotation.

Figure 11B:
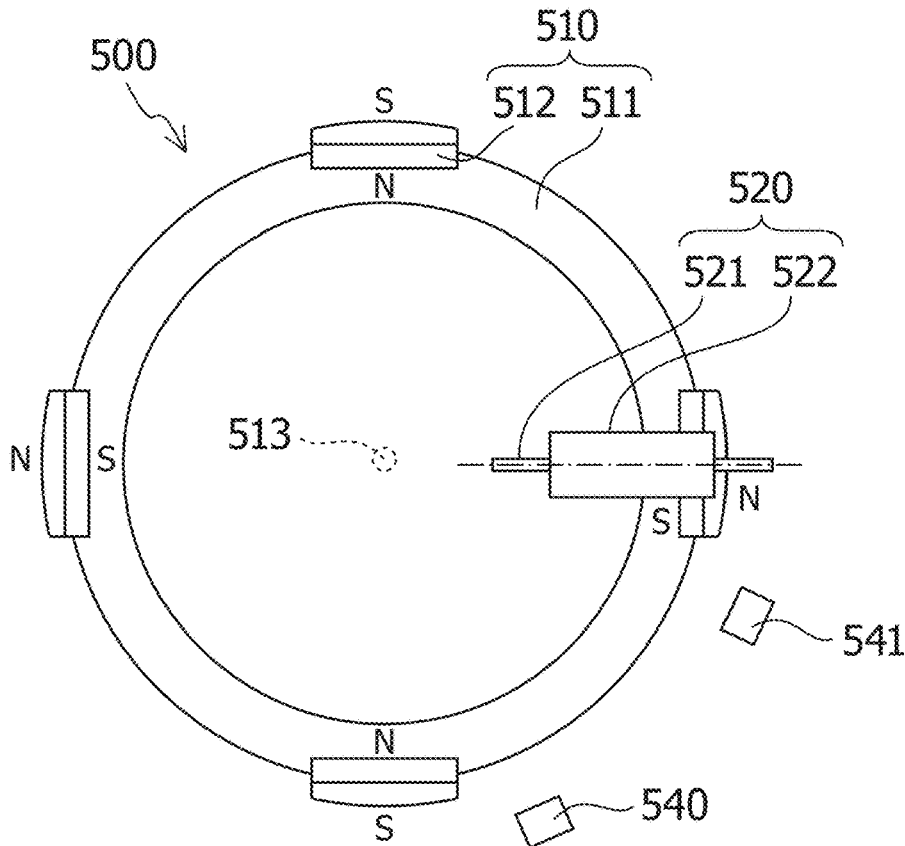
FIG. 11B is an upper view of a rotary-type detector based on the fifth embodiment.

The first magnetic sensor 540 and the second magnetic sensor 541 are disposed so as to be able to detect the magnetic fields of the magnetic-field generation sources in correspondence to those eight places. The magnetic sensors are disposed by being shifted from each other by phases of −20 degrees and +20 degrees such that the first magnetic sensor 540 can detect the magnetic field at the time of the forward rotation and the second magnetic sensor 541 can detect the magnetic field at the time of the reverse rotation. As shown in FIG. 11B, the first magnetic sensor 540 is disposed in a position slightly spaced apart from one magnet 512 (referred to as a first magnet) in a clockwise direction when the first magnet comes to a place directly below the magnetic wire 521, and the second magnetic sensor 541 is disposed in a position slightly spaced apart from another magnet, which is adjacent to the first magnet in the clockwise direction, in a counterclockwise direction. The arrangement of the first magnetic sensor and the second magnetic sensor only needs to be determined, as appropriate, in accordance with a material, a size, and the like of the magnets.

In FIG. 11B, right rotation of the moving body 510 is the forward rotation and left rotation thereof is the reverse rotation. The first magnetic sensor 540 takes a role of signal identification of the power generation sensor 520 at the time of the forward rotation, and the second magnetic sensor 541 takes a role of signal identification of the power generation sensor 520 at the time of the reverse rotation. When a direction at 3 o'clock in FIG. 11B is 0 degrees, the power generation sensor 520 is in a position of 0 degrees, the first magnetic sensor 540 is in a position of +70 degrees, and the second magnetic sensor 541 is in a position of +20 degrees. The magnetic wire is in the position of 0 degrees, and both magnetic sensors are disposed in a region from 0 degrees to 90 degrees but may be disposed in any one of three other regions (a region from 90 degrees to 180 degrees, a region from 180 degrees to 270 degrees, and a region from 270 degrees to 360 degrees).

Figure 12A:
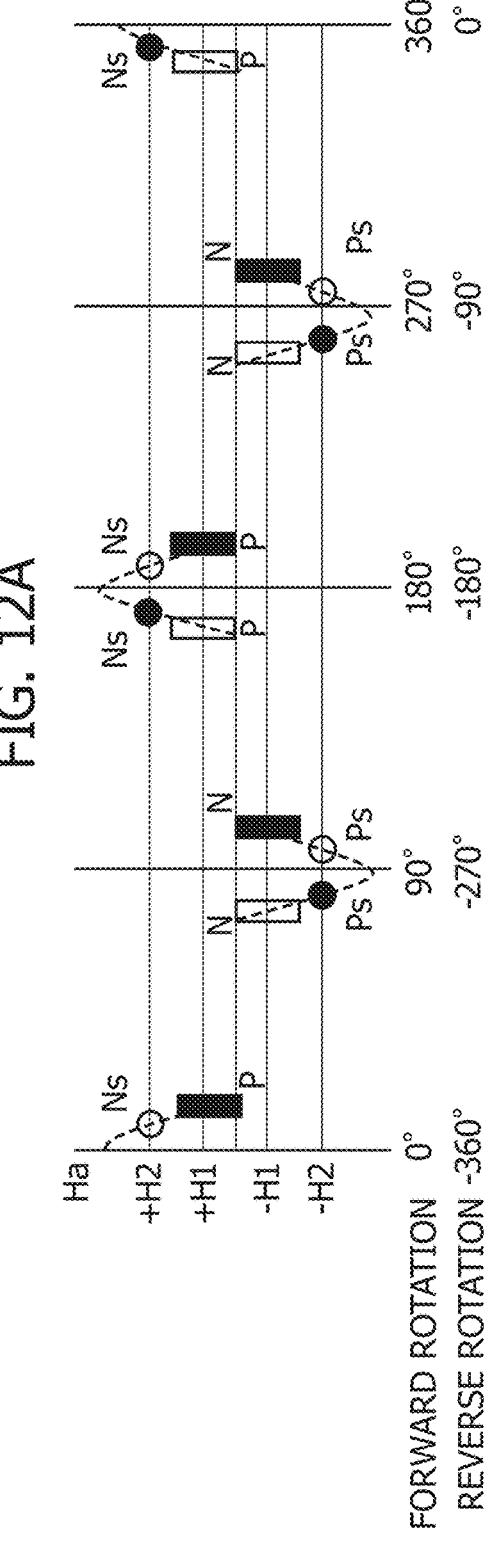
FIG. 12A is an explanatory view showing magnetic fields applied to a power generation sensor based on the fifth embodiment, and output signals.

In FIG. 12A, the magnetic field Ha applied to the power generation sensor 520 at the time of rotation of the moving body 510 is indicated by dotted lines. In the drawing, a positive pulse signal generated in the power generation sensor 520 at the time of the forward rotation is indicated by reference character P, a stabilizing magnetic field serving as the basis of the output of the signal P is indicated by reference character Ps, a negative pulse signal is indicated by reference character N, and a stabilizing magnetic field serving as the basis of the output of the signal N is indicated by reference character Ns. The stabilizing magnetic field is ±H2, the operating magnetic field is ±H1, and the output at the time of the reverse rotation is indicated by the same reference character as that at the time of the forward rotation, but the reference character at the time of the forward rotation is indicated by being colored in white and the reference character at the time of the reverse rotation is indicated by being colored in black. The magnetic field applied to the power generation sensor 520 from the magnets 512 is an alternating magnetic field of two periods for one rotation. Therefore, regarding the signals of the power generation sensor 520, the positive and negative (P, N) signals are output two times each for one forward rotation, and the positive and negative (P, N) signals are output two times each for one reverse rotation as with the forward rotation.

Figure 12B:
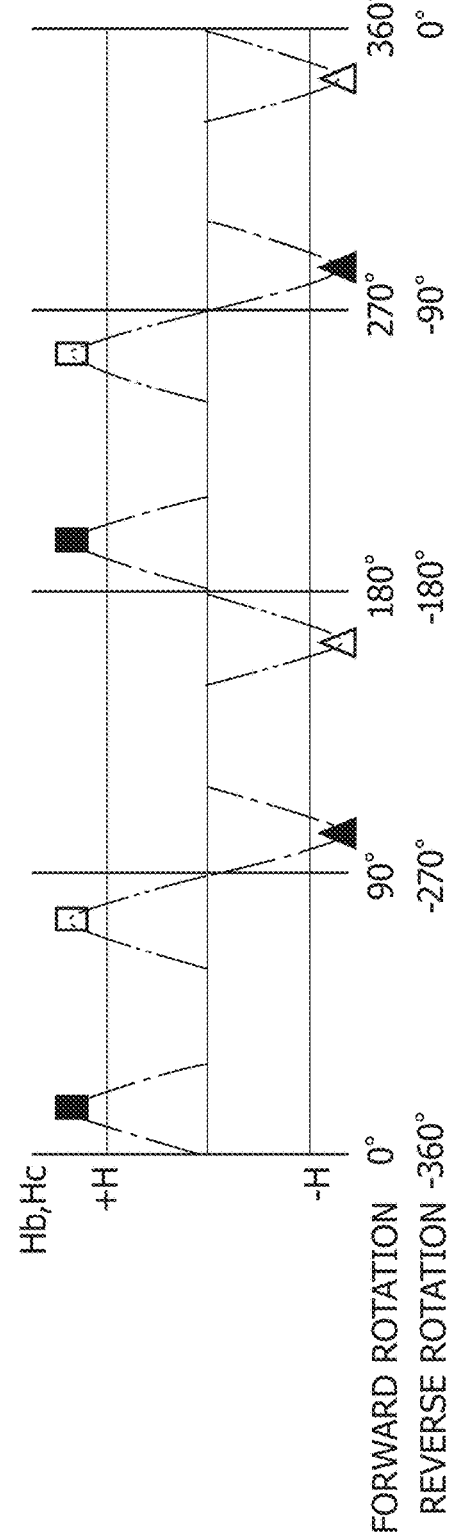
FIG. 12B is an explanatory view showing magnetic fields applied to a magnetic sensor based on the fifth embodiment, and output signals.

In FIG. 12B, the magnetic field Hb applied to the first magnetic sensor 540 is indicated by a two-dot chain line, and a magnetic field Hc applied to the second magnetic sensor 541 is indicated by a one-dot chain line. As described above, the first magnetic sensor 540 and the second magnetic sensor 541 are disposed to be spaced apart from the power generation sensor 520 in the circumferential direction. Therefore, the alternating magnetic fields Hb and Hc are shifted in phase from the alternating magnetic field Ha shown in FIG. 12A.

As the magnetic sensors 540 and 541, a magnetic sensor that can determine NS poles (plus and minus in the drawing) such as a Hall element and a magneto-resistive element (SV-GMR, TMR) can be used.

When two P-signals of the forward rotation are output from the power generation sensor 520, a detection signal of a minus magnetic field is output from the first magnetic sensor 540 (white-colored triangular shapes in the drawing). When two N-signals of the forward rotation are output from the power generation sensor 520, a detection signal of a plus magnetic field is output from the first magnetic sensor 540 (white-colored quadrilateral shapes in the drawing).

When two P-signals of the reverse rotation are output from the power generation sensor 520, a detection signal of a plus magnetic field is output from the second magnetic sensor 541 (black-colored quadrilateral shapes in the drawing). When two N-signals of the reverse rotation are output from the power generation sensor 520, a detection signal of a minus magnetic field is output from the second magnetic sensor 541 (black-colored triangular shapes in the drawing).

As shown in FIG. 12C, four signals, that are, P, P', N, and N' that are identified are obtained by combining detection signals of the first magnetic sensor 540 and the second magnetic sensor 541 with the output signals of the power generation sensor 520. The detector 500 can be used for the multi-rotation of the motor when operation is performed in accordance with "Method of Determining Number of Rotations and Rotation Direction" and "Method of Synchronizing Positions and Number of Rotations in One Rotation" described above by these four types of signals.

Another Circuit Example

The detector in each embodiment uses the power generation sensor including the magnetic wire. Therefore, as it is already known, an output signal in accordance with a large Barkhausen effect thereof is an electromotive force and can be utilized as a power source. In other words, by adding a function of processing an output of the power generation sensor by a rectifier and a capacitor, the detector of the first embodiment can be used as a switch (opening and closing of a door and a position of a shutter), for example, and the detectors of the second and third embodiments can be used as a meter (flow rate, water supply, air volume, and gas), for example. A power source or a battery does not necessarily need to be used for a use that does not need synchronization of rotation angles within one rotation as above. Data can also be wirelessly transmitted by use of electric power by the power generation sensor. The present invention can be applied to a technology of causing the multi-rotation position detector of the motor to be battery-less by supplying electric power to the circuit and the magnetic sensor from the power generation sensor in the detectors of the fourth and fifth embodiments.

Operation and Effects

Operation and effects of the embodiments described above are described again.

When the magnetic-field generation source approaches the power generation sensor, a magnetic field is applied to the axial-direction first end portion side of the magnetic wire in the power generation sensor, but a magnetic field is not applied to the axial-direction second end portion side because the axial-direction second end portion side does not face the magnetic-field generation source. As a result, magnetic domains can be reversed all at once from the axial-direction first end portion toward the axial-direction second end portion. Thus, a magnetic induction yoke is not needed, and a single magnetic domain is formed in the entire magnetic wire as with a method of applying a magnetic field to both ends of the magnetic wire. As a result, a high-output pulse signal from the power generation sensor is obtained.

The axial-direction dimension of a part of the magnetic wire facing the magnetic-field generation source can be set to be equal to or less than half the length of the magnetic wire by applying a magnetic field to one axial end side on one side of the magnetic wire. Therefore, a relatively large magnet needed in a method of applying a magnetic field to the entire wire length of the magnetic wire becomes unnecessary. By choosing the material of the magnet, as appropriate, the magnet can be reduced to a thinness that enables a stabilizing magnetic field to be applied. The adjustment range of a gap (a distance between an NS boundary of the magnetic-field generation sources and the first end portion of the magnetic wire) is wide because the magnetic field of a side surface of the magnetic-field generation source of the magnetic wire is detected. Durability is provided, and hence a stability in output is obtained.

The magnetic field to be applied is applied to one axial end side of the magnetic wire. On an axial end on which the magnetic field is not applied, an influence of a magnetic interference between adjacent heteropolar magnetic-field generation sources on the magnetic wire is alleviated. This is also due to a feature in which the soft magnetic body portion concentrates magnetic force. Therefore, the plurality of magnetic-field generation sources can be disposed to be close to each other. It becomes possible to enhance the density in the number of poles of the magnetic-field generation sources (the number of poles for an outer circumferential length of the moving body). When the moving body is a rotating moving body, the outer circumference of the rotating moving body can be set to be short. In other words, the entire structure of the detector becomes small in size.

Magnetic fields with equal strengths do not necessarily need to be applied to both end portions or the entire body of the magnetic wire, and hence, the degree of freedom in arrangement is high. As long as the magnetic wire is disposed on a straight line parallel to the rotational axis of the rotating moving body, the shape of the soft magnetic body portion can be either a ring-like shape or a disk-like shape. Either of a hollow-type or a shaft-type can be adapted as a radial-gap-rotary-type detector. In this structure, the dimension of the rotating moving body in the rotational axis direction fits in a length equal to or less than the magnetic wire length, and a thin detector is obtained. In a hollow-type, the power generation sensor can be disposed on the outer circumferential side when the inner diameter of the detector is desired to be large, and the power generation sensor can be disposed on the inner circumferential side when the outer diameter is desired to be small. In other words, there is a degree of freedom in design.

In terms of the degree of freedom in arrangement, when the magnetic wire is installed on a straight line orthogonal to the rotational axis, the shape of the soft magnetic body portion can be a ring-like shape or a disk-like shape. In other words, adaptation as a hollow-type or shaft-type axial-gap-rotary-type detector is possible. When the rotational axis is in the up-down direction, electronic components configuring a circuit of the power generation sensor and the like can be stably mounted on a horizontally disposed board.

The magnetic wire can be disposed to be orthogonal to the rotational axis of the rotating moving body. In this case, a shaft-type axial-gap-rotary-type detector is obtained. An alternating magnetic field of two or more periods are applied. Further downsizing (in particular, downsizing of the radial-direction dimension) can be performed. The stability of the signal induced in the coil wound around the magnetic wire can be enhanced.

In a shaft-type axial-gap-rotary-type detector, when the number of the magnetic-field generation sources is four or eight, the following occurs. When the center of the magnetic wire is disposed in the center of the rotational axis, homopolar magnetic fields are applied to both ends of the wire, and a large Barkhausen phenomenon cannot be caused. However, a uniform multi-period alternating magnetic field is applied to the magnetic wire by shifting the magnetic wire from the center of the rotational axis (providing an offset). In particular, by setting the number of the magnetic-field generation sources to be four, the alternating magnetic field of two periods that is the minimum period can be applied, and a rotating moving body with the minimum radius is obtained.

A magnetic sensor may be provided in addition to the power generation sensor. An alternating magnetic field of two periods is applied, and hence the power generation sensors do not necessarily need to be provided by a plurality of numbers.

Sixth Embodiment

FIG. 13A and FIG. 13B show a rotation detector 1100 based on the first embodiment. The rotation detector 1100 includes a rotating body 1110 that rotationally moves and one power generation sensor 1120.

The rotating body 1110 includes one ring-like supporting body 1111 formed by a soft magnetic body, and a plurality of magnets 1112 that are magnetic-field generation sources. The plurality of magnets 1112 are fixed to an outer circumferential surface of the supporting body 1111 at even intervals in a circumferential direction. Examples of a fixing method include embedding, fitting, and adhesion. The magnets 1112 are each magnetized in an axial line direction 1113 (an up-down direction on the plane of the paper of FIG. 13B) of the rotating body 1110 and each have a pair formed by an N-pole and an S-pole. The magnet 1112 has a magnetic pole surface 1112a on an axial-line-direction upper side of the rotating body 1110. It is preferred that there be no level difference between the magnetic pole surface 1112a and the axial-line-direction upper side surface of the supporting body 1111. The plurality of magnets 1112 are disposed such that adjacent magnetic poles 1112a are heteropolar. The rotating body 1110 rotates about an axial line 1113 extending in an up-down direction as a rotational axis.

The power generation sensor 1120 has a magnetic wire 1121 in which a large Barkhausen phenomenon occurs and a coil 1122 wound around the magnetic wire 1121. The magnetic wire 1121 is disposed in a radial direction of the rotating body 1110. An outer-circumferential-side diameter of a rotation trajectory of the magnets 1112 mounted on the rotating body 1110 is greater than a magnetic wire length 1121L. The magnetic wire 1121 has an axial-direction central portion 1121a, an axial-direction first end portion 1121b, and an axial-direction second end portion 1121c. The axial-direction central portion 1121a of the magnetic wire 1121 is offset from the axis 1113 in the radial direction of the rotating body 1110. An offset amount is indicated by reference character OF11. The axial-direction first end portion 1121b and the axial-direction second end portion 1121c are positioned on a radial-direction outer side and a radial-direction inner side of the rotating body 1110, respectively. A direction of motion of the magnets 1112 in accordance with the rotation motion of the rotating body 1110 is perpendicular to an axial direction of the magnetic wire 1121, and the magnetic pole surfaces 1112a pass through a place below a region (referred to as a "first region") that is at least a part of a place from the axial-direction central portion 1121a to the axial-direction first end portion 1121b of the magnetic wire 1121. At the same time, the supporting body 1111 passes through a place below a region (referred to as a "second region") adjacent to the radial-direction inner side of the first region out of the magnetic wire 1121. As a result, a magnetic field from the magnets 1112 is efficiently applied to the region from the axial-direction central portion 1121a to the axial-direction first end portion 1121b of the magnetic wire 1121 while a magnetic field equal to or greater than the operating magnetic field is not applied to the axial-direction second end portion 1121c of the magnetic wire 1121.

When 20 magnets 1112 are provided at even intervals along the outer circumferential direction of the ring-like supporting body 1111 as in FIG. 13A and FIG. 13B, a positive pulse signal is induced ten times and a negative pulse signal is induced ten times in the coil 1122 for one forward rotation of the rotating body 1110. A positive pulse signal is induced ten times and a negative pulse signal is induced ten times for one reverse rotation of the moving body 1110.

The rotation detector 1100 is a rotation detector in which the rotating body 1110 is a hollow-type. The magnets 1112 are on an outer circumferential portion of the rotating body 1110, and the power generation sensor 1120 faces the outer circumferential portion of the rotating body 1110 in the rotational axis direction. Therefore, a protruding amount of the power generation sensor 1120 to the radial-direction outer side with respect to the outer diameter of the rotating body 1110 serving as a reference is small, and the entire detector has an outer diameter that is suppressed to the minimum necessary and is small in size. The power generation sensor can be horizontally placed on a board (not shown) on which electronic components configuring a detection circuit are mounted, and the stability of mounting is high.

The positional relationship between the magnetic wire 1121 and the rotating body 1110 is described in further detail.

Figure 14A:
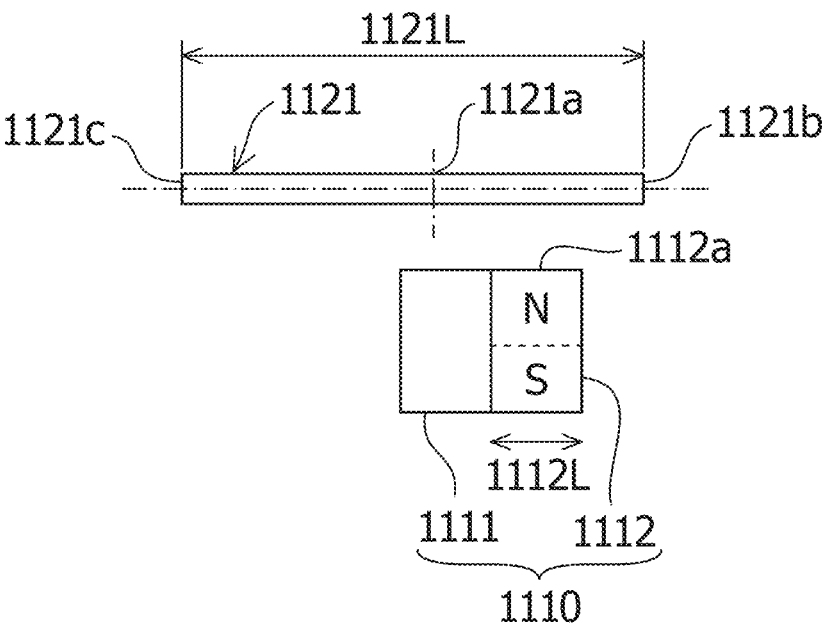
FIG. 14A is an explanatory view in accordance with a cross-sectional view showing a magnetic wire and a rotating body of the sixth embodiment.

As shown in FIG. 14A, when the rotating body 1110 rotationally moves, the magnetic pole surface 1112a of each magnet 1112 that causes a magnetic field passes through a place below the first region of the magnetic wire 1121. The supporting body 1111 passes through a place below the second region of the magnetic wire 1121.

Figure 14B:
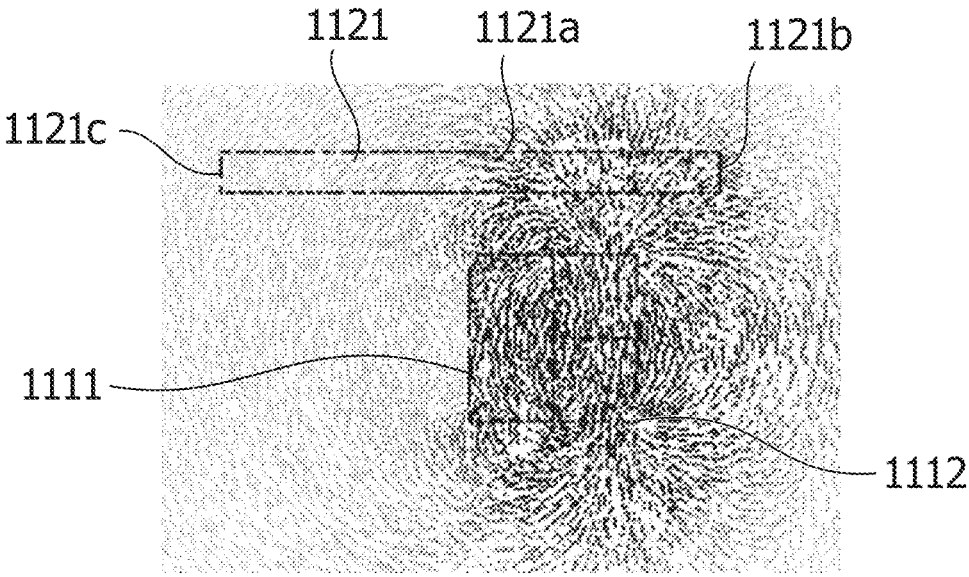
FIG. 14B is a magnetic simulation diagram of the sixth embodiment.

FIG. 14B shows a magnetic simulation result obtained by the magnetic wire 1121 and each of the supporting body 1111 and the magnet 1112. The supporting body 1111 is soft magnetic, and a magnetic field is applied in a concentrated manner to the axial-direction first end portion 1121b side of the magnetic wire 1121 facing the magnet 1112 by a magnetic concentration effect and a shielding effect thereof. When the magnetic field is locally applied to the axial-direction first end portion 1121b, a reverse magnetic field is propagated toward the axial-direction second end portion

1121c from the axial-direction first end portion 1121b in the magnetic wire 1121, and a single magnetic domain is formed in the entire magnetic wire.

Figure 14C:
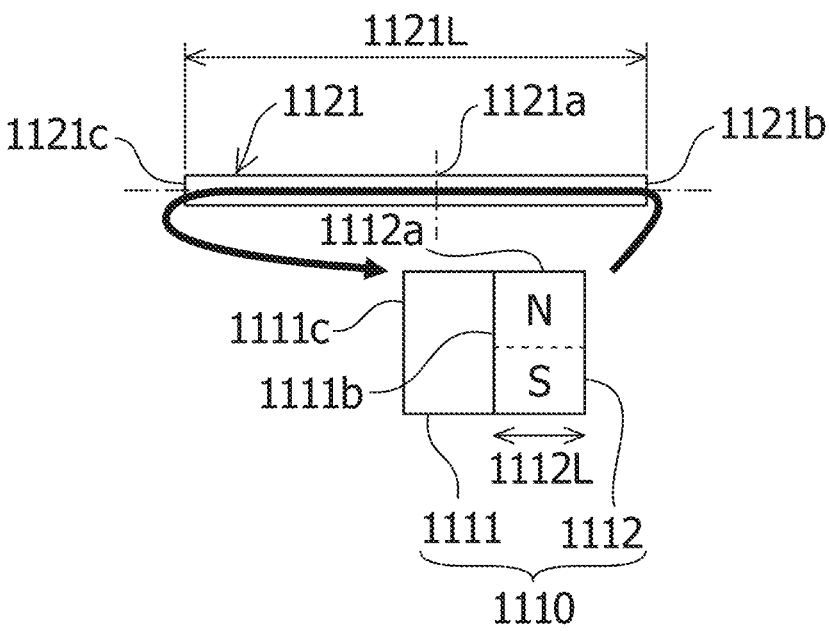
FIG. 14C is an explanatory view showing a positional relationship between the magnetic wire and the rotating body of the sixth embodiment.

Next, with reference to FIG. 14C, an additional effect in a case in which an interval between the supporting body 1111 and the axial-direction second end portion 1121c is smaller than an interval between the magnet 1112 and the axial-direction second end portion 1121c is described. A magnet mounting surface 1111b of the supporting body 1111 is below a region from the axial-direction central portion 1121a to the axial-direction first end portion 1121b of the magnetic wire 1121. A supporting body surface 1111c of the supporting body 1111 opposite from the magnet mounting surface 1111b in the radial direction is below a region from the axis central portion 1121a to the axial-direction second end portion 1121c of the magnetic wire 1121.

The direction from the mounting surface 1111b for the magnetic-field generation source 1112 with respect to the supporting body 1111 toward the magnetic-field generation source is the radial-direction outer-side direction. The direction from the axial-direction second end portion 1121c toward the axial-direction first end portion 1121b of the magnetic wire 1121 is also the radial-direction outer-side direction.

At this time, a magnetic circuit as that indicated by an arrow in FIG. 14C is configured by the magnetic wire 1121, the magnet 1112, and the supporting body 1111 formed by a soft magnetic body. Therefore, a stabilizing magnetic field is applied to the magnetic wire in the same manner as applying a magnetic field to the entire magnetic wire and in a wider range than a related-art approach in which a magnetic field is applied to both end portions of the magnetic wire. Therefore, a single magnetic domain is formed in the entire magnetic wire, and a high-output pulse signal is obtained.

Figure 15:
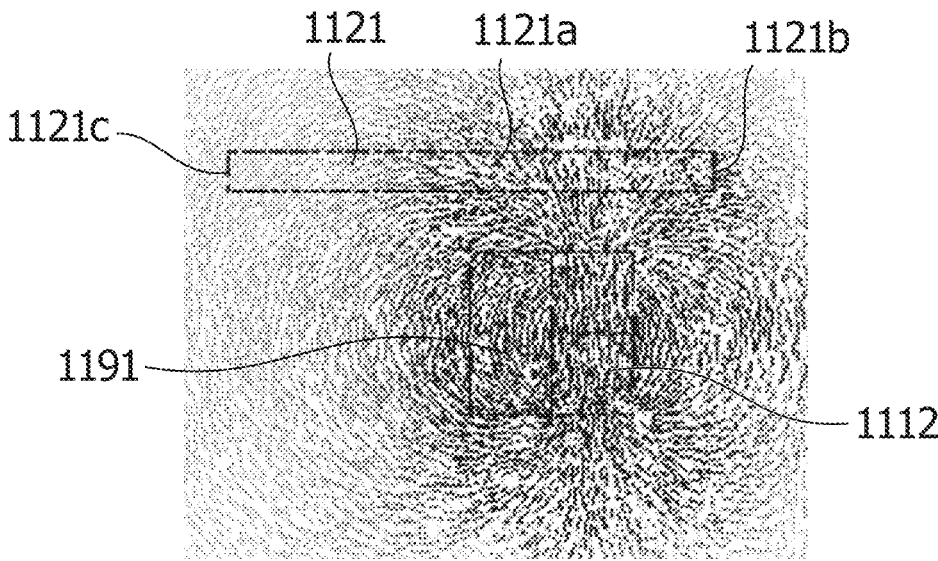
FIG. 15 is another magnetic simulation diagram.

In addition, FIG. 15 shows a magnetic simulation result obtained by the magnetic wire 1121 and each of the magnet 1112 and a supporting body 1191 formed by a non-magnetic body in place of the supporting body 1111 formed by the soft magnetic body. Unlike FIG. 14B, a magnetic field is also applied to the axial-direction central portion 1121a and the second end portion 1121c in addition to the axial-direction first end portion 1121b. Therefore, a single magnetic domain is barely formed across the entire magnetic wire.

Figure 14D:
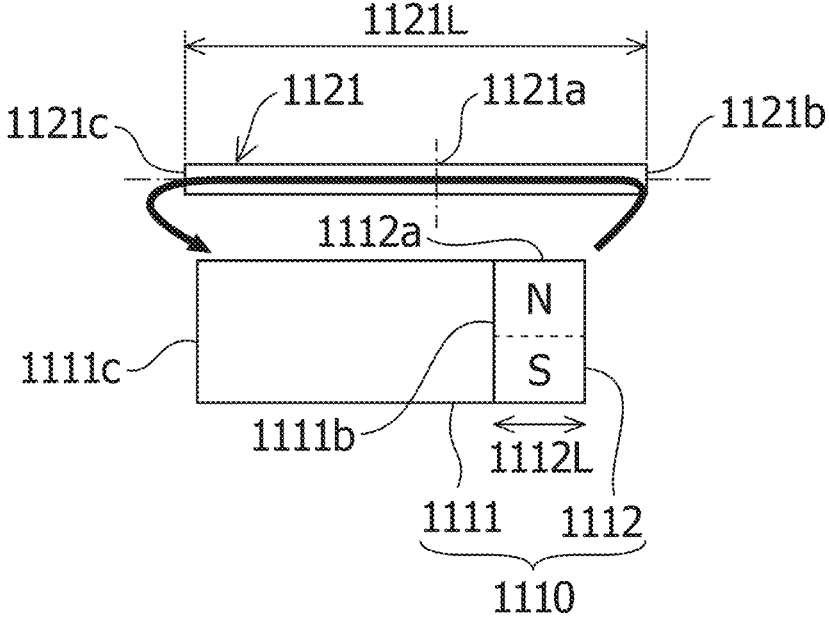
FIG. 14D is an explanatory view showing a positional relationship between a magnetic wire and a rotating body in a modified example of the sixth embodiment.

As shown in FIG. 14D, the radial-direction dimension of the supporting body 1111 may be increased toward the radial-direction inner side, and the radial-direction positions of the supporting body surface 1111c and the axial-direction second end portion 1121c of the magnetic wire 1121 may be substantially the same. In this case, the magnetic resistance of the magnetic circuit becomes even smaller, the applied magnetic field is propagated to the entire wire more easily, and the output of the pulse signal is further increased.

Seventh Embodiment

Figure 16A:
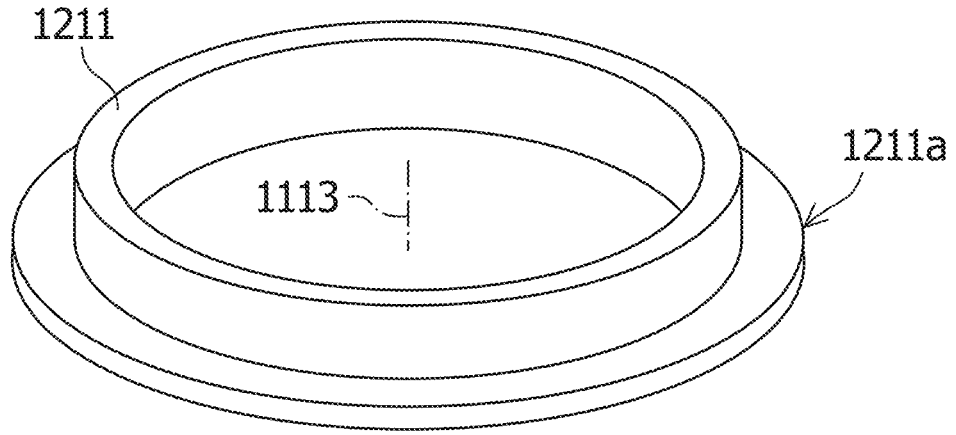
FIG. 16A is a perspective view of a supporting body based on a seventh embodiment.
Figure 16B:
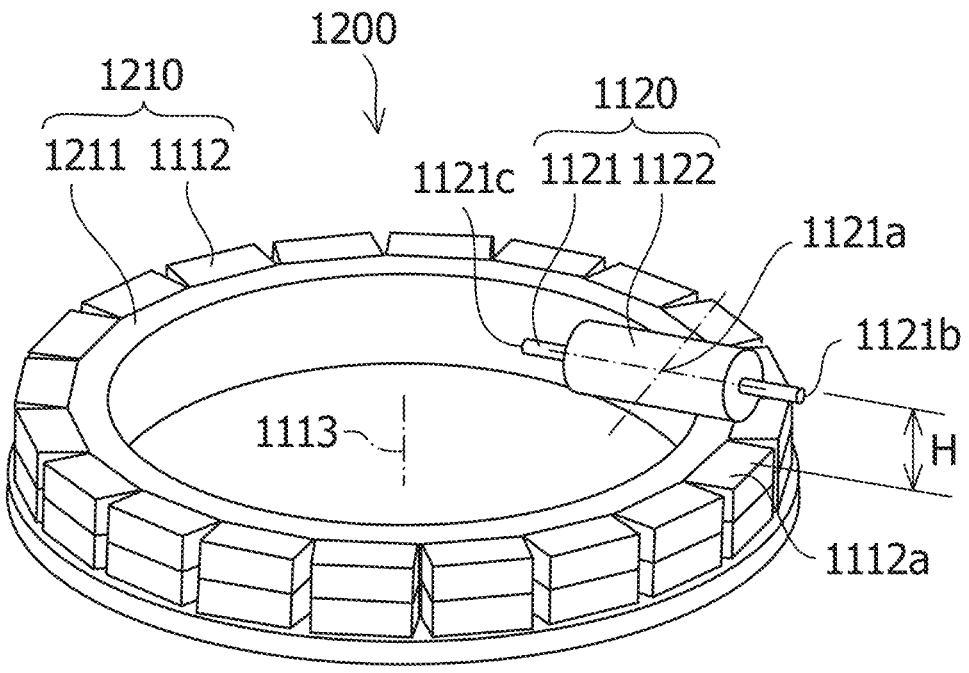
FIG. 16B is a perspective view of a rotation detector based on the seventh embodiment.

FIG. 16A and FIG. 16B show a rotation detector 1200 according to a seventh embodiment. The same elements as those in FIG. 13A and FIG. 13B are denoted by the same reference characters, and detailed descriptions are omitted.

The rotation detector 1200 has a rotating body 1210 that rotationally moves. The rotating body 1210 includes one ring-like supporting body 1211 formed by a soft magnetic body. The supporting body 1211 has a flange portion 1211a protruding to the radial-direction outer side from a rotational-axis-direction lower end portion across the entire outer circumference. The plurality of magnets 1112 are fixed to an outer circumferential surface of the supporting body 1211 and an upper surface of the flange portion 1211*a* at even intervals in the circumferential direction. By a back yoke effect (described below) of the flange portion 1211*a*, a tolerance range of a gap H between the power generation sensor 1120 and the magnetic pole surface 1112*a* in the rotational axis direction becomes wider as compared to the sixth embodiment. In other words, the degree of freedom in design increases, and a further preferable state is obtained.

Figure 16C:
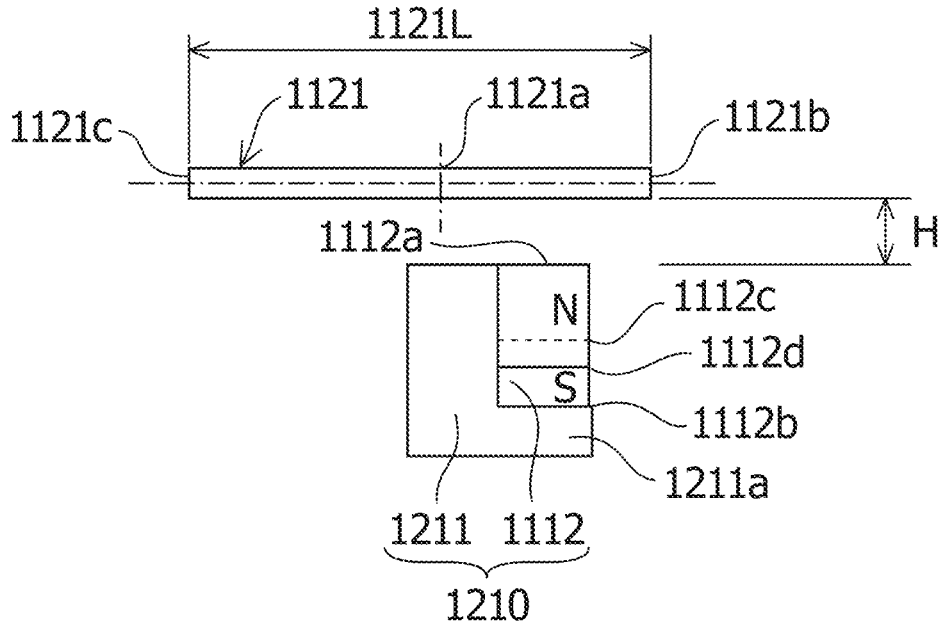
FIG. 16C is an explanatory view in accordance with a cross-sectional view showing a magnetic wire and a rotating body of the seventh embodiment.
Figure 16D:
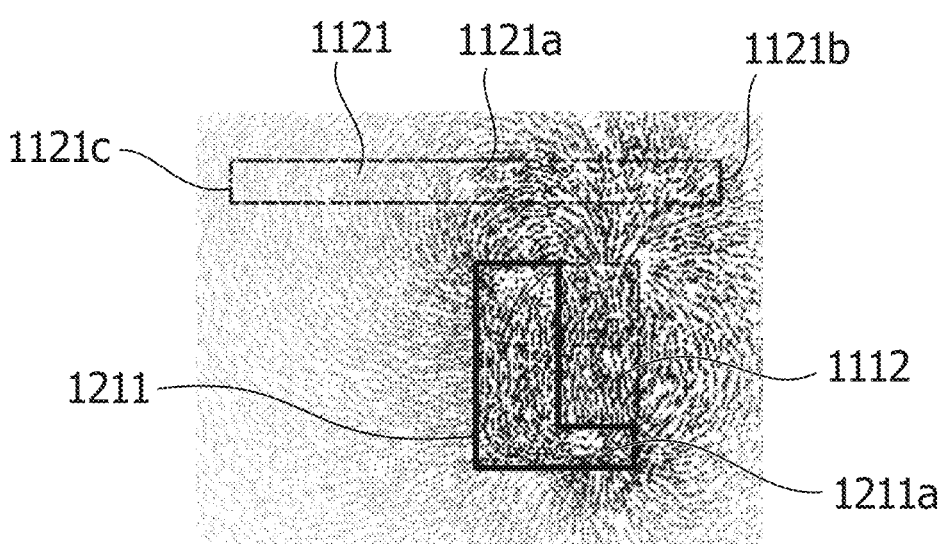
FIG. 16D is a magnetic simulation diagram of the seventh embodiment.

FIG. 16C shows a positional relationship between the magnetic wire 1121 and each of the supporting body 1211 and the magnets 1112. FIG. 16D shows a magnetic simulation result obtained by the magnetic wire 1121 and each of the supporting body 1211 and the magnet 1112. The flange portion 1211*a* is mounted on a magnetic pole surface 1112*b* on the side opposite from the magnetic pole surface 1112*a* of the magnet 1112. Therefore, by a magnetic concentration effect obtained by the flange portion 1211*a*, in other words, a back yoke function of the flange portion, it can be understood that a magnetic pole borderline of the magnet 1112 shifts to the flange portion 1211*a* side from reference character 1112*c* (dotted line) to reference character 1112*d* (solid line). By the back yoke effect as above, a leakage magnetic field from the magnetic pole surface 1112*a* increases as compared to a leakage magnetic field in accordance with the supporting body 1111 without a flange portion. Therefore, the tolerance range of the gap H between the power generation sensor 1120 and the magnetic pole surface 1112*a* widens, the degree of freedom in the selection of the size, the material, and the like of the magnets increases, and the stability of the mounting improves.

Modified Example of Seventh Embodiment

Figure 17A:
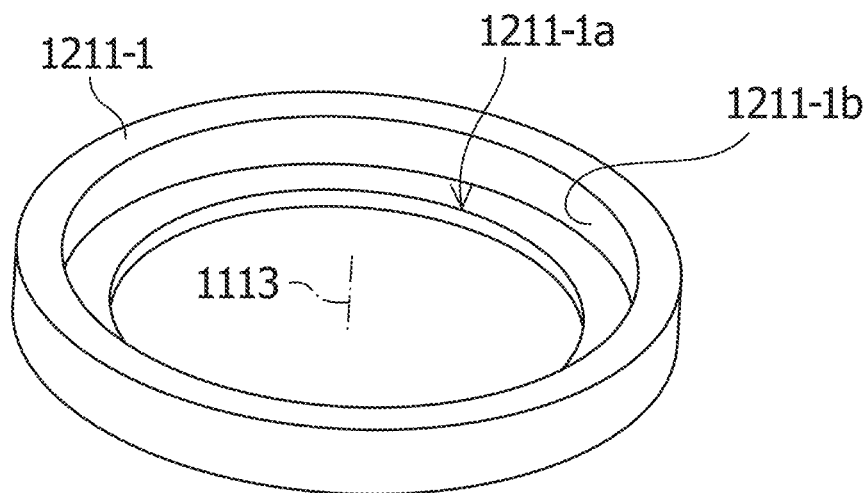
FIG. 17A is a perspective view of a supporting body based on a modified example of the seventh embodiment.
Figure 17B:
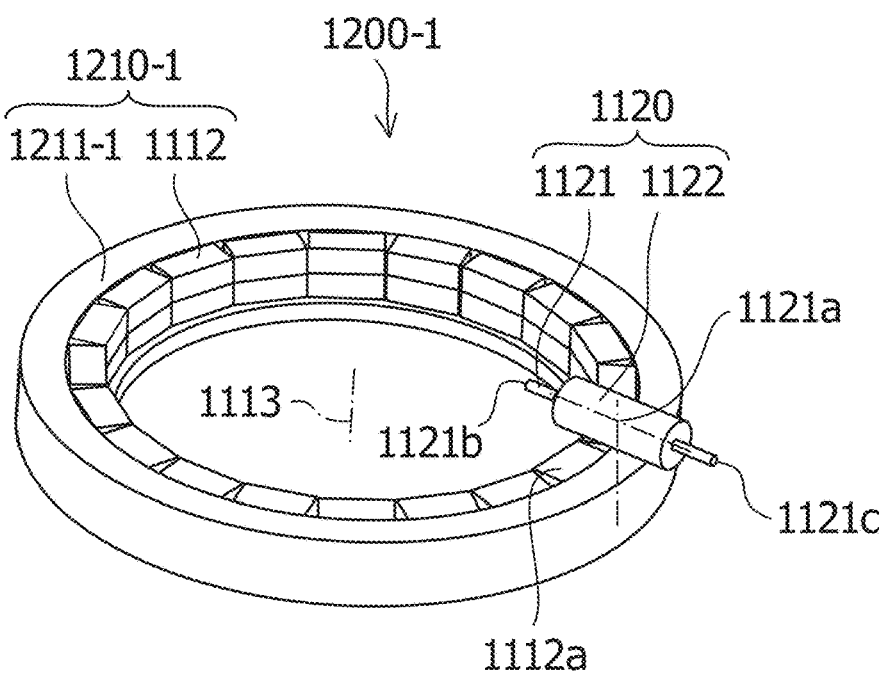
FIG. 17B is a perspective view of a rotation detector based on the modified example of the seventh embodiment.

FIG. 17A and FIG. 17B show a rotation detector 1200-1 according to a modified example of the seventh embodiment. The rotating body 1210-1 has one ring-like supporting body 1211-1 formed by a soft magnetic body. The supporting body 1211-1 has a flange portion 1211-1*a* protruding to the radial-direction inner side from a rotational-axis-direction lower end portion across the entire inner circumference. The plurality of magnets 1112 are fixed to an inner circumferential surface of the supporting body 1211-1 and an upper surface of the flange portion 1211-1*a* at even intervals in the circumferential direction. The outer-circumferential-side diameter of a rotation trajectory of the magnets 1112 mounted on the supporting body 1211-1 is greater than a magnetic wire length 1121L.

Unlike the embodiment in which the flange portion is on the outer circumferential surface, the axial-direction first end portion 1121*b* and the axial-direction second end portion 1121*c* are positioned on the radial-direction inner side and the radial-direction outer side of the rotating body 1210-1, respectively. The direction of motion of the magnets 1112 is perpendicular to the axial direction of the magnetic wire 1121 by the rotation motion of the rotating body 1210-1, and the magnetic pole surfaces 1112*a* pass through a place below a region (referred to as a "first region") that is at least a part of a place from the axial-direction central portion 1121*a* to the first end portion 1121*b* of the magnetic wire. At the same time, the supporting body 1211-1 passes through a place below a region (referred to as a "second region") adjacent to the radial-direction outer side of the first region out of the magnetic wire 1121. As a result, a magnetic field from the magnets 1112 is efficiently applied to the region from the axial-direction central portion 1121*a* to the axial-direction first end portion 1121*b* of the magnetic wire 1121 while a magnetic field equal to or greater than the operating magnetic field is not applied to the axial-direction second end portion 1121*c* side of the magnetic wire 1121.

The rotation detector of this example is a hollow-type as with the ninth and the tenth embodiments, but the positional relationship between the magnet 1112 and the supporting body is different, and the structure is advantageous when the radial-direction dimension of the hollow portion is desired to be large.

The direction from a mounting surface 1211-1*b* for the magnetic-field generation source 1112 with respect to a main body portion of the supporting body 1211-1 toward the magnetic-field generation source is a radial-direction inner-side direction. The direction from the axial-direction second end portion 1121*c* toward the axial-direction first end portion 1121*b* of the magnetic wire 1121 is also the radial-direction inner-side direction.

The plurality of magnets 1112 that are the magnetic-field generation sources formed by a plurality of pairs of NS poles are disposed on the far side and the near side on the plane of the paper in FIG. 14A and FIG. 16C. When a magnetic field is applied to the axial-direction first end portion 1121*b* of the magnetic wire 1121 by the magnetic concentration effect of the supporting bodies 1111 and 1211, the influence of a magnetic interference that occurs between adjacent magnets on the magnetic wire 1121 is also alleviated. Therefore, it becomes possible to place adjacent magnetic-field generation sources close to each other and enhance the density in the number of poles of the magnets. In other words, the rotation detector is downsized.

Eighth Embodiment

Figure 18:
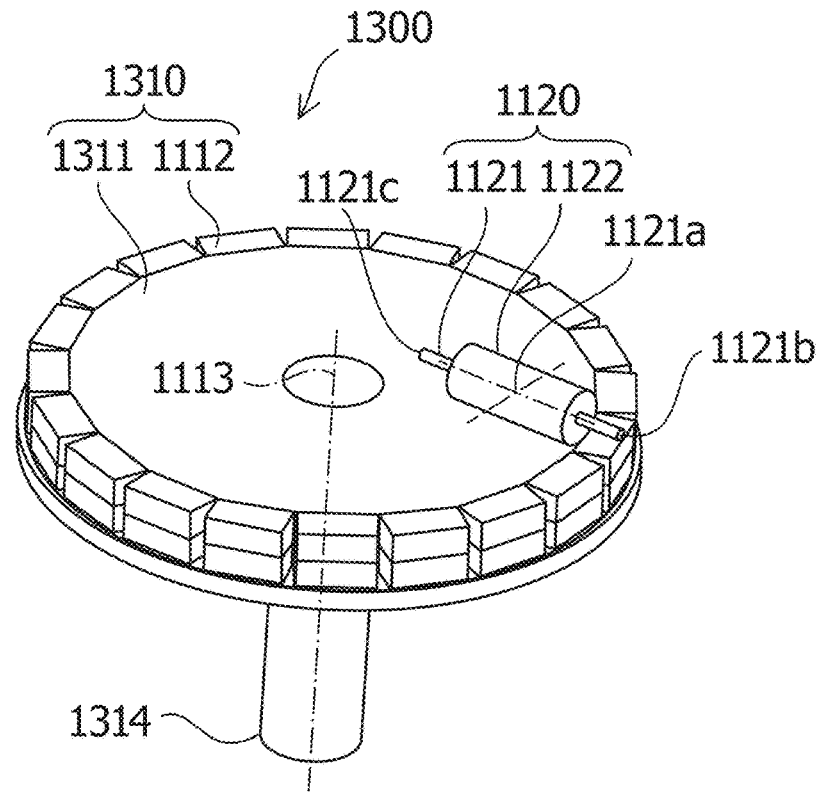
FIG. 18 is a perspective view of a rotation detector based on an eighth embodiment.

As shown in FIG. 18, a rotating body 1310 of a rotation detector 1300 has a ring-like supporting body 1311 including a flange portion protruding from an axial-direction lower end portion to the radial-direction outer side, and the plurality of magnets 1112 fixed to the outer circumferential surface at even intervals in the circumferential direction. A shaft 1314 of an apparatus responsible for the rotation is mounted on the axial line 1113 of the rotating body 1310. As above, the rotating body 1310 can be a shaft-type. The material of the shaft 1314 may be a non-magnetic body or a magnetic body. A magnetic field is applied to one axial-direction end portion of the magnetic wire 1121, and magnetic fields with equal strengths do not necessarily need to be applied to both axial-direction end portions of the magnetic wire or the entire magnetic wire. Therefore, a shaft-type structure as above becomes possible, and the degree of freedom is high.

Figure 19:
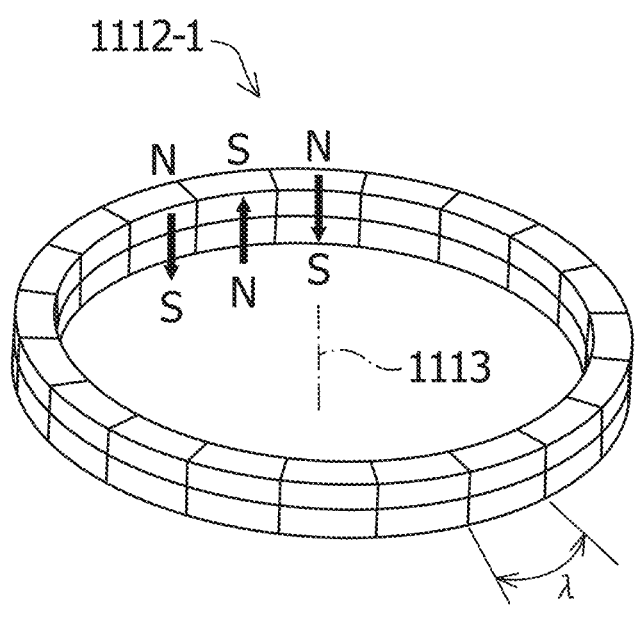
FIG. 19 is a perspective view of a multipolar-magnetized magnet according to a modified example of the eighth embodiment.

A magnet 1112-1 obtained by multipolar-magnetizing one ring-like hard magnetic body as that in FIG. 19 can also be used as a plurality of magnetic-field generation sources. An axial-direction upper surface and an axial-direction lower surface of the ring-like hard magnetic body material that is the material of the magnet 1112-1 are simultaneously magnetized by a magnetizing yoke having an area equivalent to the predetermined magnetizing pitch λ, magnetization is performed in the direction of the axial line 1113, magnetic poles appear in the upper surface and the lower surface of the hard magnetic body material, and the magnet 1112-1 is formed. One magnet 1112-1 multipolar-magnetized as above may be fixed on the supporting body 1111, 1211, or 1211-1 or the disk-like supporting body 1311.

Ninth Embodiment

Figure 20A:
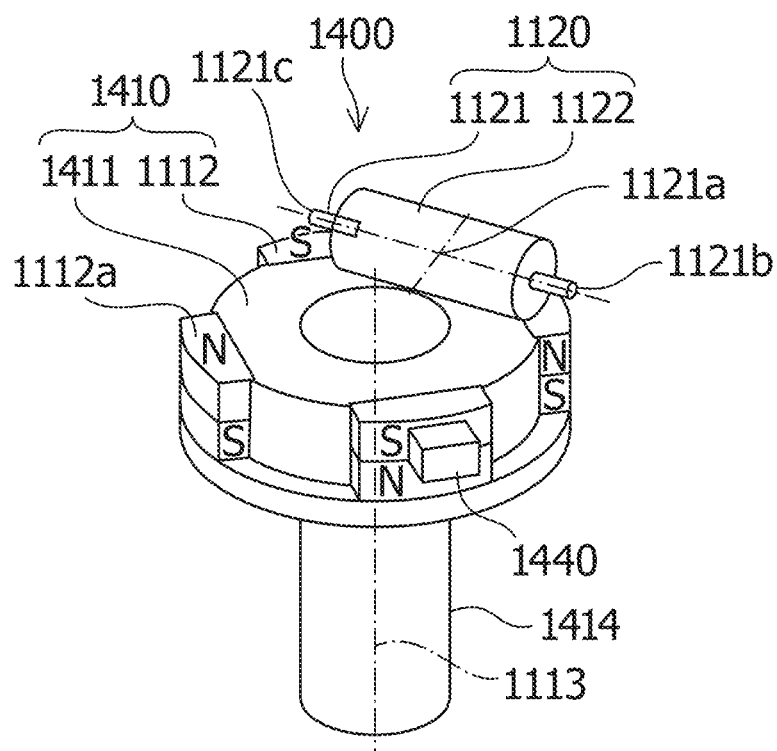
FIG. 20A is a perspective view of a rotation detector based on a ninth embodiment.
Figures 20B, 21A:
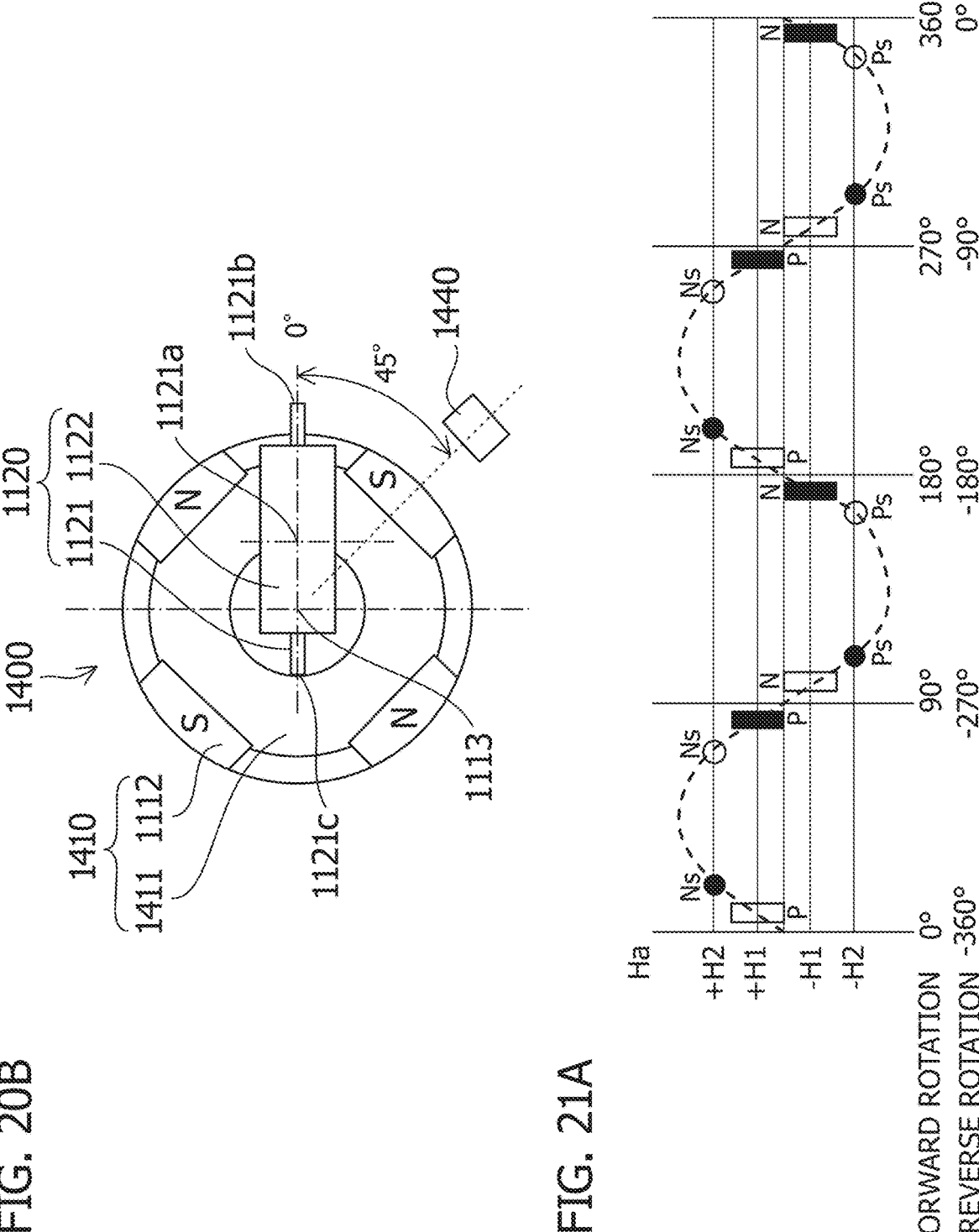
FIG. 20B is an upper view of the rotation detector based on the ninth embodiment.
FIG. 21A is an explanatory view showing magnetic fields applied to a power generation sensor according to the ninth embodiment, and output signals.

FIG. 20A and FIG. 20B show a rotation detector 1400 having a multi-rotation detection function based on a ninth embodiment. The detector 1400 includes a rotating body 1410 that rotates and one power generation sensor 1120. The rotating body 1410 is formed by a soft magnetic body, and has a supporting body 1411 having a substantially square plate-like shape and having an outer circumferential surface on which a flange portion is provided, and four magnets 1112 serving as magnetic-field generation sources. The four magnets 1112 are disposed on four edge portions of the supporting body 1411 at even intervals in the circumferential direction. A shaft 1414 is mounted on the axial line 1113 of the rotating body 1410. The magnet 1112 is magnetized in the direction of the axial line 1113 and has a pair of an N-pole and an S-pole. Two adjacent magnets 1112 have different magnetization directions. Magnets having outer circumferential surfaces of arc shape are shown, but magnets having a C-like shape, a cuboid shape, and the like can also be used.

The power generation sensor 1120 has the magnetic wire 1121 in which a large Barkhausen phenomenon occurs and the coil 1122 wound around the magnetic wire 1121. The magnetic wire 1121 is positioned in the radial direction of the rotating body 1411 and intersects with the axial line 1113. The outer-circumferential-side diameter of a rotation trajectory of the magnets 1112 mounted on the rotating body 1411 is greater than the length of the magnetic wire 1121.

By the rotation motion of the rotating body 1410, the magnetic pole surfaces 1112a of the magnets 1112 pass through a place below a region that is at least a part of a place from the axial-direction central portion 1121a to the axial-direction first end portion 1121b of the magnetic wire 1121 (referred to as a "first region"). The supporting body 1411 and the shaft 1414 pass through a place below a region (referred to as a "second region") adjacent to the radial-direction inner side of the first region out of the magnetic wire 1121. Although the magnetic wire 1121 intersects with the axial line 1113, the magnetic pole surfaces 1112a of the magnets 1112 do not pass through a place below a region from the axial-direction central portion 1121a to the axial-direction second end portion 1121c of the magnetic wire 1121.

By the structure above, when the rotating body 1410 rotates one time, a uniform alternating magnetic field of two periods is applied to a region between the axial-direction central portion 1121a and the axial-direction first end portion 1121b of the magnetic wire 1121.

When there are four magnetic-field generation sources, the outer diameter of the rotating body can be caused to be the smallest by this structure. When there are six magnetic-field generation sources, a magnetic pole of a certain magnet close to the second end portion 1121c and a magnetic pole of another magnet facing the magnet in the radial direction and close to the first end portion 1121b can be heteropolar. In this case, it becomes possible to apply a uniform alternating magnetic field even when the outer diameter of the rotating body is caused to be even smaller and the magnets 1112 are caused to pass through a place below the second end portion 1121c.

The rotation detector 1400 further includes one magnetic sensor 1440. The magnetic sensor 1440 is disposed in a position in which a magnetic field from the magnetic-field generation source can be determined when the power generation sensor 1120 outputs a pulse signal.

When a certain magnet (referred to as a "first magnet") out of the four magnets 1112 passes through the vicinity of the magnetic wire 1121, a stabilizing magnetic field is applied to the magnetic wire 1112. Next, when a second magnet adjacent to the first magnet approaches the magnetic wire 1121, an operating magnetic field in a direction opposite from the stabilizing magnetic field described above is applied to the magnetic wire 1121, and the power generation sensor 1120 outputs a pulse signal.

As shown in FIG. 20B, the magnetic sensor 1440 is disposed to form a predetermined angle with the axial direction of the magnetic wire. The predetermined angle is about 45 degrees. Alternatively, the predetermined angle may be about 135 degrees, about 225 degrees, or about 315 degrees.

Description of Multi-Rotation Function

Next, a detector having a multi-rotation detection function is described. For accurate position detection at the time of power activation, a detector for an absolute angle within one rotation is used. The power generation sensor is used in coarse detection for one rotation unit at the time of power shutdown. The power generation sensor outputs a total of two pulses, in other words, one positive pulse and one negative pulse for one period of an alternating magnetic field. However, it cannot be determined whether the rotation is forward rotation or reverse rotation with only this pulse. Thus, the following methods have hitherto been used.

1) A method of obtaining a phase difference signal by increasing the number of power generation sensors 2) A method of adding other detection means The former needs a plurality of power generation sensors. The latter can be achieved by one power generation sensor and an additional sensor element as described in Patent Document 2.

When one power generation sensor is used, a stabilizing magnetic field and an operating magnetic field need to be applied to the magnetic wire in a determined order to obtain a pulse signal at a sufficient level. When the rotating body rotates in reverse immediately after an operating magnetic field is applied to the magnetic wire and a pulse signal is output at the time of the forward rotation of the rotating body, one turn of a pulse signal necessary for rotation detection is not obtained because the order described above is not followed. In this case, an error exceeds ±180 degrees, and correct rotation amount detection cannot be performed.

It has hitherto been difficult to balance both the acquisition of a multi-period alternating magnetic field and the downsizing of the detector. However, as shown in FIG. 20A and FIG. 20B, the number of the magnetic-field generation sources can be four, and an alternating magnetic field of two periods for one rotation can be applied to the magnetic wire. In other words, a detector that includes a multi-rotation detection function, is small in size, is low in cost, and is stable in terms of the output of a pulse signal can be obtained. The form is described in detail below.

Method of Determining Number of Rotations and Rotation Direction

In FIG. 20B, the right rotation of the rotating body 1410 is the forward rotation, and the left rotation thereof is the reverse rotation. The magnetic field Ha applied to the power generation sensor 1120 at the time of rotation is shown in FIG. 21A. A positive pulse signal generated in the power generation sensor 1120 at the time of the forward rotation is indicated by reference character P, a stabilizing magnetic field serving as the basis of the output of the signal P is indicated by reference character Ps, a negative pulse signal is indicated by reference character N, and a stabilizing magnetic field serving as the basis of the output of the signal N is indicated by reference character Ns. The stabilizing magnetic field is ±H2, and the operating magnetic field is ±H1. The output at the time of the reverse rotation is indicated by the same reference character as that at the time of the forward rotation, but the reference character at the time of the forward rotation is indicated by being colored in white and the reference character at the time of the reverse rotation is indicated by being colored in black.

A magnetic field applied from a permanent magnet 1112 to the power generation sensor 1120 becomes an alternating magnetic field of two periods for one rotation. Therefore, the power generation sensor 1120 outputs positive and negative (P, N) signals two times for one forward rotation, and outputs positive and negative (P, N) signals two times for one reverse rotation as with the time of forward rotation.

Figures 21B, 21C:
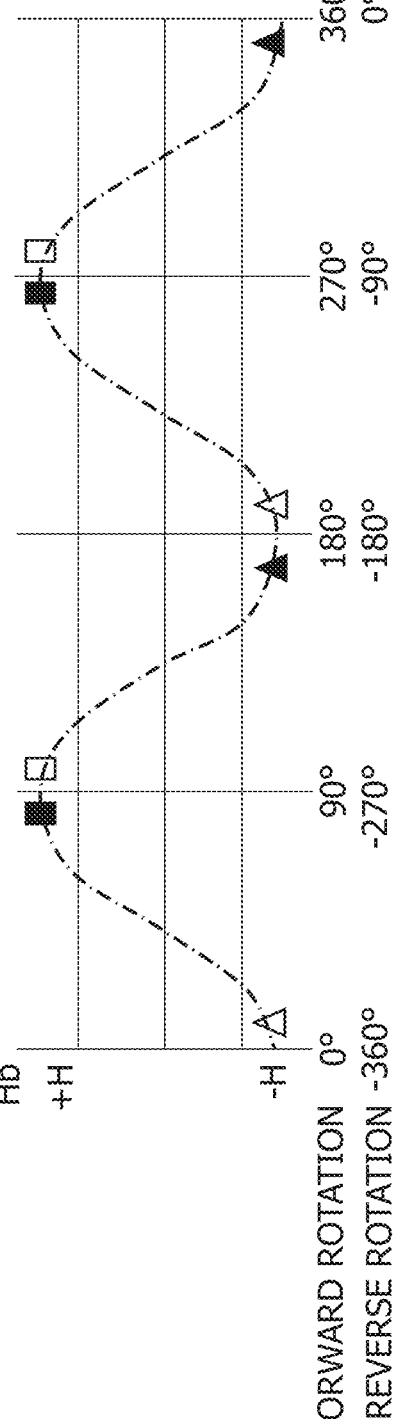
FIG. 21B is an explanatory view showing magnetic fields applied to a magnetic sensor according to the ninth embodiment, and output signals.
FIG. 21C is an explanatory view showing combinations of a detection result of the power generation sensor and a detection result of the magnetic sensor according to the ninth embodiment.

In FIG. 21B, the magnetic field Hb applied to the magnetic sensor 1440 is indicated by a one-dot chain line. As described above, the magnetic sensor 1440 is disposed so as to form an angle of about 45 degrees with the axial-direction first end portion 1121b about the rotational axis 1113. Therefore, the alternating magnetic field Hb is shifted from the alternating magnetic field Ha shown in FIG. 21A by a phase of 45 degrees. As the magnetic sensor 1440, a magnetic sensor that can determine NS poles (plus and minus in the drawing) such as a Hall element and a magneto-resistive element (SV-GMR, TMR) can be used. In this case, when two P-signals of the forward rotation and two N-signals of the reverse rotation are output from the power generation sensor 1120, a signal indicating that a minus magnetic field has been detected is output from the magnetic sensor 1440. The above is indicated by triangular shapes colored in white and black in the drawing. When two N-signals of the forward rotation and two P-signals of the reverse rotation are output from the power generation sensor 1120, a signal indicating that a plus magnetic field has been detected is output from the magnetic sensor 1440. The above is indicated by quadrilateral shapes colored in white and black in the drawing.

FIG. 21C shows combinations of an output signal of the power generation sensor 1120 and a detection signal of the magnetic sensor 1440.

Figures 21D, 21E:
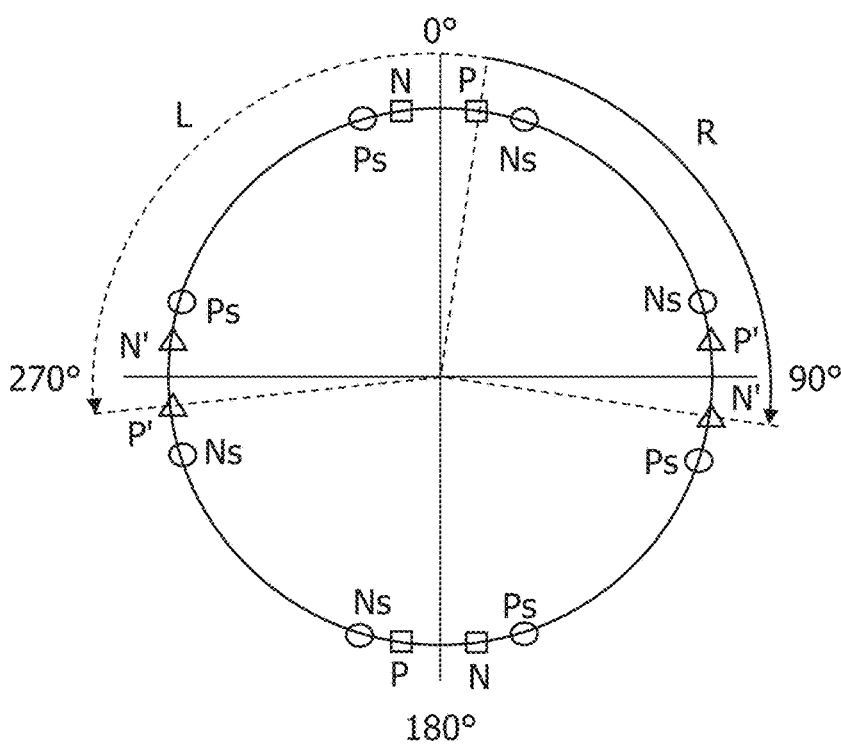
FIG. 21D is an explanatory view showing synchronization and rotational coordinates of output signals of the power generation sensor and the magnetic sensor based on the ninth embodiment.
FIG. 21E is an explanatory view showing the number of counts of the output signal.

FIG. 21D shows rotational coordinates. A rotation angle from when a positive pulse signal P is output to when the rotating body 1410 rotates to the right as indicated by reference character R and the next signal N' is detected is +90 degrees. On the other hand, when the rotating body 1410 rotates to the left as indicated by reference character L immediately after the positive pulse signal P is output, the next signal is expected to be the signal N. However, the stabilizing magnetic field Ns is not passed. Therefore, the signal N is not output or the signal N is extremely small even when the signal N is output, and it becomes difficult to perform evaluation. Therefore, a rotation angle until the next evaluable left rotation signal that is the signal P' can be output is about-(90 degrees+α). As above, even when there is rotation motion in which a stabilizing magnetic field is not applied in either of the forward rotation or the reverse rotation, a range in which the same signal is duplicated is not generated. A range of the positions that can be determined becomes less than 360 degrees, and the number of rotations of the rotating body 1410 can be accurately detected.

Regarding the method of determining the rotation direction of the rotating body 1410, a case in which there are two successive signals is described as one example to facilitate understanding.

The determination is performed by a signal processing circuit (not shown) including a memory. The signal processing circuit has an identification function, a reference function, and a calculation function. First, the signal processing circuit identifies signals from the power generation sensor 1120 as any one of four signals, that are, P, P', N, and N' by the identification function. Next, the signal processing circuit successively writes a previous history signal (previous state) stored in an initial state for starting the counting of the number of rotations and the rotation direction and a signal (new state) in accordance with the rotation thereafter into a memory by the reference function. The signal processing circuit searches a preset table obtained by four types of codes for two successive past and current signals stored in the memory, and returns a count value that has matched. One example of the table is shown in FIG. 21E. The signal processing circuit performs search every time a signal is input, and a count value of the result thereof is sequentially added and subtracted as the calculation function. Numerical values obtained by addition and subtraction indicate the number of rotations and the rotation direction at that time point. By setting a reference position between the signal N and the signal P and using a table as that shown in FIG. 21E, the rotation direction and the number of rotations of the rotating body 1410 can be accurately counted.

Method of Synchronizing Positions and Number of Rotations in One Rotation

When a rotation detector is used for multi-rotation of a motor, the number of rotations is detected by a method described above with reference to FIG. 21E during a power suspension of a motor driving system. When the motor driving system is activated, each of the signals P, P', N, and N' exists in two places in one rotation. Thus, it becomes a choice between two regions, and the number of rotations cannot be specified. Therefore, the displacement angle needs to be determined from a reference position of a rotational counter. Thus, one-rotation absolute-type position sensor is externally mounted. As a result, it can be determined which region the position is in, and the number of rotations can be specified.

Modified Example of Ninth Embodiment

Figure 22A:
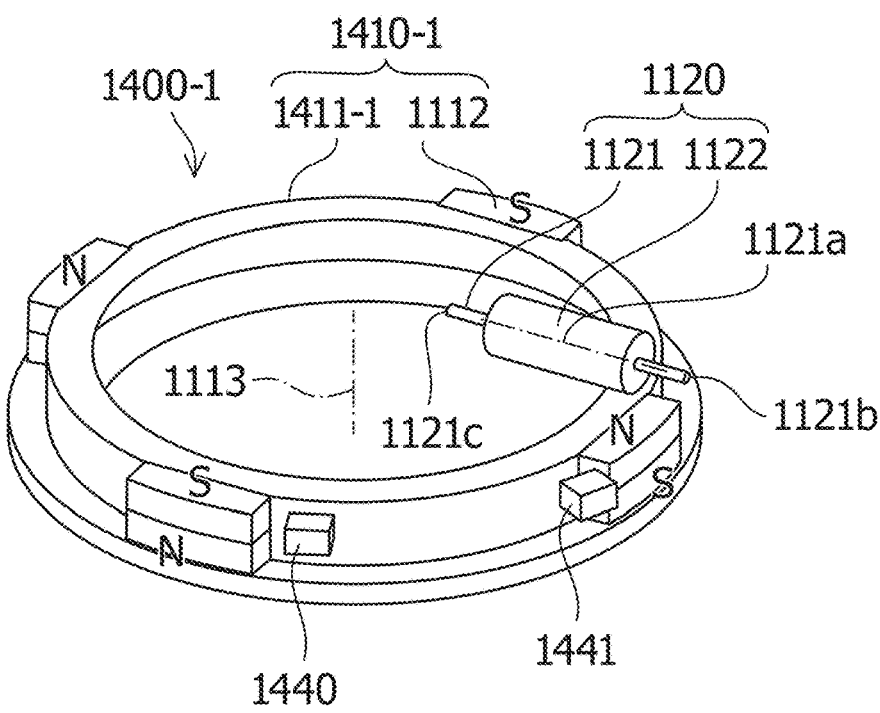
FIG. 22A is a perspective view of a rotation detector based on a modified example of the ninth embodiment.
Figure 22B:
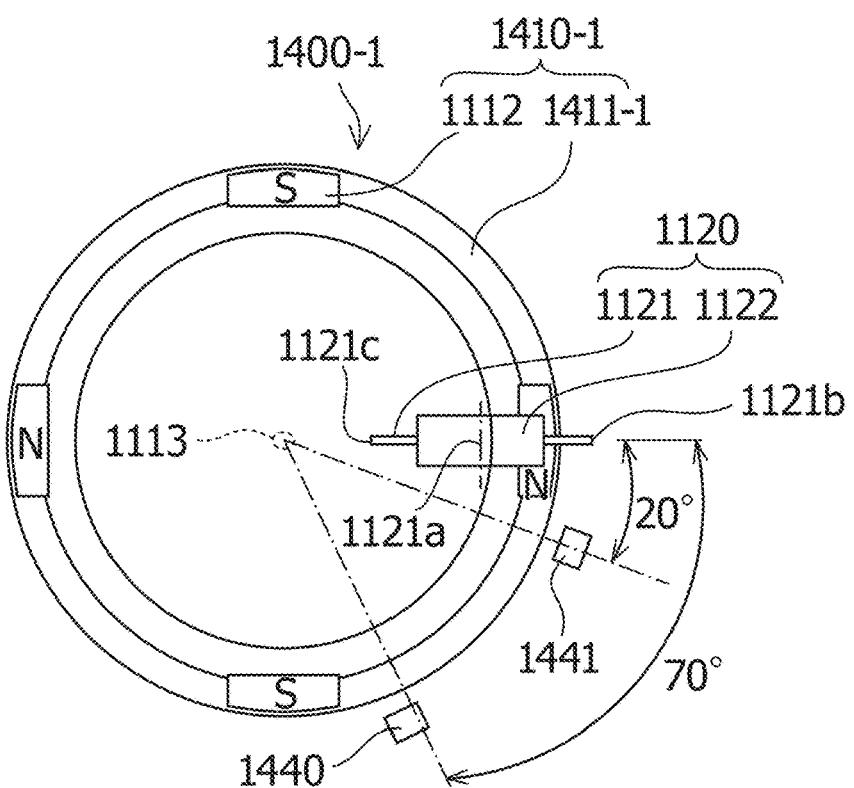
FIG. 22B is an upper view of the rotation detector based on the modified example of the ninth embodiment.

As shown in FIG. 22A and FIG. 22B, as a modified example of the ninth embodiment, the multi-rotation function can also be provided in a hollow type. A rotation detector 1400-1 includes a rotating body 1410-1, eleven power generation sensors 1120, and two magnetic sensors 1440 and 1441. The rotating body 1410-1 is formed by a soft magnetic body and has a ring-like supporting body 1411-1 including a flange portion on an outer circumferential surface and four magnets 1112 fixed to the outer circumferential surface of the supporting body 1411-1 at even intervals in the circumferential direction. The power generation sensor 120 includes the magnetic wire 1121 and the coil 1122.

In the ninth embodiment described above, a total of eight signals, that is, four for each of the forward rotation and the reverse rotation of the power generation sensor 1120 can be covered by one magnetic sensor 1440 in a position spaced apart from the magnetic wire 1121 by about 45 degrees in the circumferential direction. This is because the magnetic-field generation sources disposed at even intervals in the circumferential direction are close to each other by a certain degree, and a sufficient magnetic field that can be detected with only one magnetic sensor 1440 in both the forward rotation and the reverse rotation is applied to the magnetic sensor 1440. However, when four magnets are provided in a hollow type as in the sixth embodiment or the seventh embodiment, the magnets may not be close to each other. A case as above is described below.

In FIG. 22A, the power generation sensor 1120 outputs a pulse signal when a certain magnet out of the four magnets 1112 passes through the vicinity of the magnetic wire 1121, the next magnet comes closer, a reverse magnetic field gradually becomes stronger, and an operating magnetic field is applied. The rotation positions of the rotating body 1410-1 when a pulse signal is output are a total of eight positions, that is, rotation positions at which the power generation sensor 1120 outputs the positive pulse signal P and the negative pulse signal N at the time of the forward rotation and rotation positions at which the power generation sensor 1120 outputs the positive pulse signal P and the negative pulse signal N at the time of the reverse rotation.

The first magnetic sensor 1440 and a second magnetic sensor 1441 are disposed so as to be able to detect the magnetic fields of the magnetic-field generation sources in correspondence to those eight places. The magnetic sensors are disposed by being shifted from each other by phases of −20 degrees and +20 degrees such that the first magnetic sensor 1440 can detect the magnetic field at the time of the forward rotation and the second magnetic sensor 1441 can detect the magnetic field at the time of the reverse rotation. As shown in FIG. 22B, when one magnet 1112 (referred to as a first magnet) comes to a place directly below the magnetic wire 1121, the first magnetic sensor 1440 is disposed in a position slightly spaced apart from another magnet, which is adjacent to the first magnet in a clockwise direction, in a counterclockwise direction, and the second magnetic sensor 1441 is disposed in a position slightly spaced apart from the first magnet in the clockwise direction. The arrangement of the first magnetic sensor and the second magnetic sensor only needs to be determined, as appropriate, in accordance with the material, the size, and the like of the magnets.

In FIG. 22B, the right rotation of the rotating body 1410 is the forward rotation, and the left rotation thereof is the reverse rotation. The first magnetic sensor 1440 takes a role of signal identification of the power generation sensor 1120 at the time of the forward rotation, and the second magnetic sensor 1441 takes a role of signal identification of the power generation sensor 1120 at the time of the reverse rotation. When a direction at 3 o'clock in FIG. 22B is 0 degrees, the power generation sensor 1120 is in a position of 0 degrees, the first magnetic sensor 1440 is in a position of +70 degrees, and the second magnetic sensor 1441 is in a position of +20 degrees. The magnetic wire is in the position of 0 degrees, and both the magnetic sensors are disposed in a region from 0 degrees to 90 degrees but may be disposed in any one of three other regions (a region from 90 degrees to 180 degrees, a region from 180 degrees to 270 degrees, and a region from 270 degrees to 360 degrees).

Figure 23A:
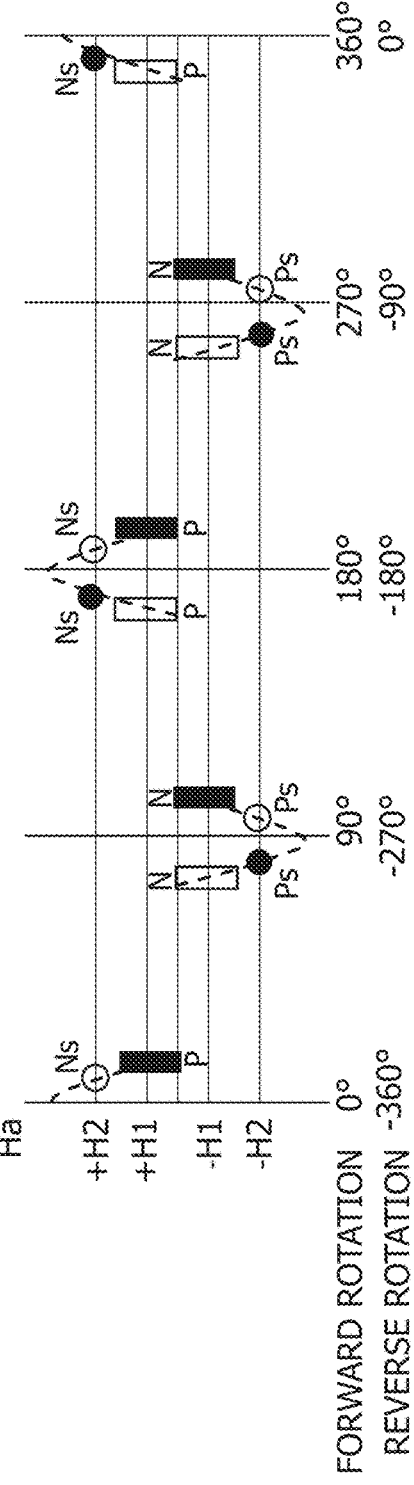
FIG. 23A is an explanatory view showing magnetic fields applied to a power generation sensor based on the modified example of the ninth embodiment, and output signals.

The magnetic field Ha applied to the power generation sensor 1120 at the time of rotation of the rotating body 1410-1 is indicated by a dotted line in FIG. 23A. In the drawing, a positive pulse signal generated in the power generation sensor 1120 at the time of the forward rotation is indicated by reference character P, a stabilizing magnetic field serving as the basis of the output of the signal P is indicated by reference character Ps, a negative pulse signal is indicated by reference character N, and a stabilizing magnetic field serving as the basis of the output of the signal N is indicated by reference character Ns. The stabilizing magnetic field is ±H2, the operating magnetic field is ±H1, and the output at the time of the reverse rotation is indicated by the same reference character as that at the time of the forward rotation, but the reference character at the time of the forward rotation is indicated by being colored in white and the reference character at the time of the reverse rotation is indicated by being colored in black. The magnetic field applied to the power generation sensor 1120 from the magnets 1112 is an alternating magnetic field of two periods for one rotation. Therefore, regarding the signals of the power generation sensor 1120, positive and negative (P, N) signals are output two times each for one forward rotation, and positive and negative (P, N) signals are output two times each for one reverse rotation as with the forward rotation.

Figure 23B:
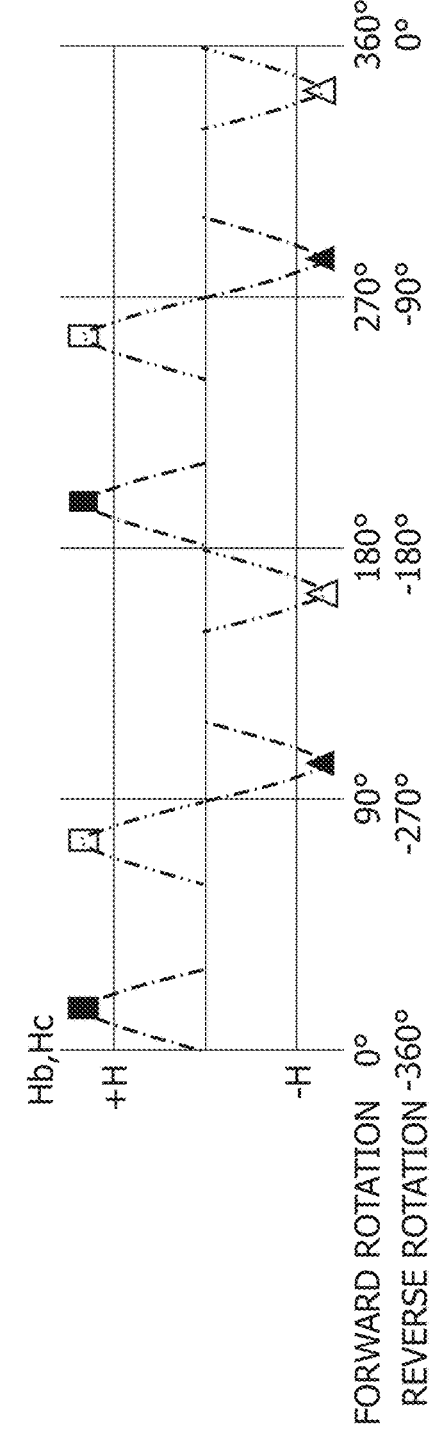
FIG. 23B is an explanatory view showing magnetic fields applied to a magnetic sensor based on the modified example of the ninth embodiment, and output signals.

In FIG. 23B, the magnetic field Hb applied to the first magnetic sensor 1440 is indicated by a two-dot chain line, and the magnetic field Hc applied to the second magnetic sensor 1441 is indicated by a one-dot chain line. As described above, the first magnetic sensor 1440 and the second magnetic sensor 1441 are disposed to be spaced apart from the power generation sensor 1120 in the circumferential direction. Therefore, the alternating magnetic fields Hb and Hc are shifted in phase from the alternating magnetic field Ha shown in FIG. 23A.

As the magnetic sensors 1440 and 1441, a magnetic sensor that can determine NS poles (plus and minus in the drawing) such as a Hall element and a magneto-resistive element (SV-GMR, TMR) can be used.

When two P-signals of the forward rotation are output from the power generation sensor 1120, a detection signal of a minus magnetic field is output from the first magnetic sensor 1440 (white-colored triangular shapes in the drawing). When two N-signals of the forward rotation are output from the power generation sensor 1120, a detection signal of a plus magnetic field is output from the first magnetic sensor 1440 (white-colored quadrilateral shapes in the drawing).

When two P-signals of the reverse rotation are output from the power generation sensor 1120, a detection signal of a plus magnetic field is output from the second magnetic sensor 1441 (black-colored quadrilateral shapes in the drawing). When two N-signals of the reverse rotation are output from the power generation sensor 1120, a detection signal of a minus magnetic field is output from the second magnetic sensor 1441 (black-colored triangular shapes in the drawing).

Figures 23C, 24A:
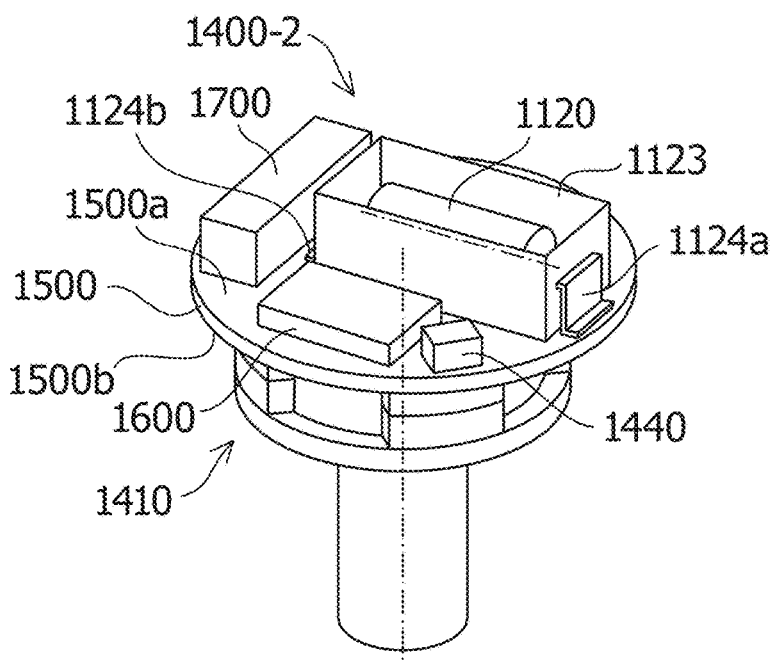
FIG. 23C is an explanatory view showing combinations of detection results of the power generation sensor, a first magnetic sensor, and a second magnetic sensor according to the modified example of the ninth embodiment.
FIG. 24A is a perspective view of a rotation detector based on a tenth embodiment.

As shown in FIG. 23C, four signals, that are, P, P', N, and N' that are identified are obtained by combining detection signals of the first magnetic sensor 1440 and the second magnetic sensor 1441 with the output signals of the power generation sensor 1120. The detector 1400-1 can be used for the multi-rotation of a motor when operation is performed in accordance with "Method of Determining Number of Rotations and Rotation Direction" and "Method of Synchronizing Positions and Number of Rotations in One Rotation" described above by those four types of signals.

Another Circuit Example

The rotation detector in each embodiment uses the power generation sensor including the magnetic wire. Therefore, as it is already known, an output signal in accordance with a large Barkhausen effect thereof is an electromotive force and can be utilized as a power source. In other words, by adding a function of processing an output of the power generation sensor by a rectifier and a capacitor, the rotation detectors of the sixth to ninth embodiments can be used as a meter (flow rate, water supply, air volume, and gas). A power source or a battery does not necessarily need to be used for a use that does not need synchronization of rotation angles within one rotation as above. Data can also be wirelessly transmitted by use of electric power by the power generation sensor. The present invention can be applied to a technology of causing the multi-rotation position detector of the motor to be battery-less by supplying electric power to the circuit and the magnetic sensor from the power generation sensor in the rotation detector of the ninth embodiment.

Tenth Embodiment

Figure 24B:
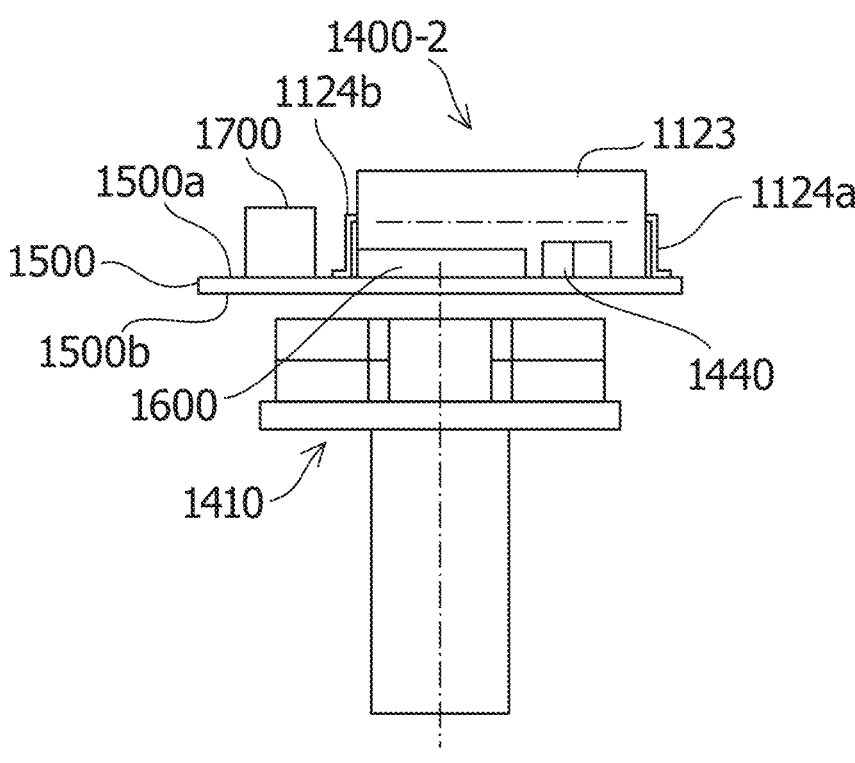
FIG. 24B is a side view of the rotation detector based on the tenth embodiment.

In the ninth embodiment and the modified example of the ninth embodiment, the power generation sensor and each of the magnetic sensor and the circuit described above can be mounted on the same board. FIG. 24A and FIG. 24B show a rotation detector 1400-2 according to a tenth embodiment. The power generation sensor 1120 is housed in a package 1123 and is fixed by resin and the like. Two terminals 1124a and 1124b wired to the coil 1122 are provided on both ends of the package, and both the terminals are mounted on a surface 1500a of a board 1500. The magnetic sensor 1440 spaced apart from the axial-direction first end portion 1121b of the magnetic wire 1121 by 45 degrees in the clockwise direction is mounted on the same board surface 1500a. A signal processing circuit 1600 including a memory is mounted on the same board surface 1500a. A connector 1700 is also mounted to take signals from the board. When the board 1500 is a double sided board, those circuits can also be mounted on a board surface 1500b on the opposite side. Another detection medium (not shown) can be provided on a surface of the rotating body 1410 facing the board surface 1500b, and one-rotation absolute-type position sensor (not shown) that detects the medium can be mounted on the board surface 1500b. As above, the structure of the present invention has an advantage in that electronic components necessary for the rotation detector can be mounted on the same board.

Operation and Effects

Operation and effects of the embodiments described above are described again.

When the magnetic-field generation source approaches the power generation sensor, a magnetic field is applied to the axial-direction first end portion side of the magnetic wire in the power generation sensor, but a magnetic field is not applied to the axial-direction second end portion side because the axial-direction second end portion side does not face the magnetic-field generation source. As a result, magnetic domains can be reversed all at once from the axial-direction first end portion toward the axial-direction second end portion. Thus, a magnetic induction yoke is not needed, and a single magnetic domain is formed in the entire magnetic wire as with a method of applying a magnetic field to both ends of the magnetic wire. As a result, a high-output pulse signal from the power generation sensor is obtained.

The axial-direction dimension of a part of the magnetic wire facing the magnetic-field generation source is equal to or less than half the length of the magnetic wire, and a relatively large magnet needed in the method of applying a magnetic field to the entire wire length of the magnetic wire is unnecessary in the embodiments of the present invention. By choosing the material of the magnet, as appropriate, the magnet can be reduced to a thinness that enables a stabilizing magnetic field to be applied. By including the flange portion in the supporting body, the magnetic-field generation source can be mounted on two surfaces, that is, a front surface of the flange portion and an outer circumferential surface of the supporting body in contact with the flange portion. Therefore, the adjustment range of the axial-direction gap between the magnetic-field generation source and the magnetic wire widens, the stability degree of mounting improves, and durability is provided. Therefore, a stability in output is obtained.

The magnetic field to be applied is applied to one axial end side of the magnetic wire. On an axial end on which the magnetic field is not applied, an influence of a magnetic interference between adjacent heteropolar magnetic-field generation sources on the magnetic wire is alleviated. This is also due to a feature in which the soft magnetic body portion concentrates magnetic force. Therefore, the plurality of magnetic-field generation sources can be disposed to be close to each other. It becomes possible to enhance the density in the number of poles of the magnetic-field generation sources (the number of poles for an outer circumferential length of the rotating body), and the outer circumference of the rotating body can be caused to be shorter. In other words, the entire structure of the detector becomes small in size.

Magnetic fields with equal strengths need not necessarily be applied to both end portions or the entire length of the magnetic wire, and hence, the degree of freedom in arrangement is high. Either of a hollow-type or a shaft-type can be adapted as a rotation detector. In a hollow-type, the power generation sensor can be disposed on the outer circumferential side when the inner diameter of the rotation detector is desired to be large, and the power generation sensor can be disposed on the inner circumferential side when the outer diameter is desired to be small. In other words, there is a degree of freedom in design.

In terms of the degree of freedom in arrangement, the magnetic wire can be disposed to be orthogonal to the rotational axis of the rotating body. In this case, a shaft-type rotation detector is obtained. Further downsizing (in particular, downsizing of the radial-direction dimension) in which an alternating magnetic field of two or more periods is applied for one rotation can be performed. The stability of the signal induced in the coil wound around the magnetic wire can be enhanced.

There is an advantage in that electronic components necessary for the rotation detector can be mounted on the same board.

The following supplements are disclosed regarding the embodiments described above.

Supplement A1

A detector that detects motion of a moving body by use of a power generation sensor, in which:

the power generation sensor includes:
    a magnetic wire in which a large Barkhausen effect occurs; and
    a coil wound around the magnetic wire;
the moving body includes:
    a soft magnetic body portion; and
    a plurality of magnetic-field generation sources mounted on the soft magnetic body portion; and
the plurality of magnetic-field generation sources each have a pair of an N-pole and an S-pole and have a magnetization direction in parallel to a mounting direction with respect to the soft magnetic body portion;
magnetic poles of two adjacent ones of the magnetic-field generation sources on a mounting-direction outer side of the magnetic-field generation sources are heteropolar;
the power generation sensor is disposed in a vicinity of a trajectory drawn by the plurality of magnetic-field generation sources by the motion of the moving body;

a direction of motion of each of the magnetic-field generation sources when the magnetic-field generation source approaches the power generation sensor is perpendicular to an axial direction of the magnetic wire;

the magnetization direction of the magnetic-field generation source when the magnetic-field generation source approaches the power generation sensor is in parallel to the axial direction of the magnetic wire; and at least one part of a place from an axial-direction central portion to an axial-direction first end portion of the magnetic wire faces a central portion of the magnetic-field generation source, and at least a part of a place from the at least one part to an axial-direction second end portion of the magnetic wire faces the soft magnetic body portion when the magnetic-field generation source approaches the power generation sensor.

Supplement A2

The detector according to Supplement A1, in which the soft magnetic body portion faces the axial-direction second end portion of the magnetic wire when the magnetic-field generation source approaches the power generation sensor.

Supplement A3

The detector according to Supplement A1 or A2, in which:

the moving body rotationally moves; and the magnetic wire is disposed in parallel to a rotational axis of the rotation motion.

Supplement A4

The detector according to Supplement A1 or A2, in which:

the moving body rotationally moves;

the magnetic wire is on a straight line orthogonal to a rotational axis of the rotation motion; and the axial-direction central portion of the magnetic wire is offset from the rotational axis.

Supplement A5

The detector according to Supplement A4, in which the magnetic wire is disposed so as to intersect with the rotational axis of the rotation motion.

Supplement A6

The detector according to any one of Supplements A1 to A5, in which the number of the magnetic-field generation sources is four.

Supplement A7

The detector according to any one of Supplements A1 to A6, further including:

a magnetic sensor that detects a magnetic field from the magnetic-field generation source when the power generation sensor outputs a signal; and a circuit that obtains a number of rotations and a rotation direction of the moving body on a basis of a signal output by the power generation sensor and the magnetic sensor in accordance with rotation motion of the moving body.

Supplement B1

A rotation detector that detects rotation motion of a rotating body by use of one power generation sensor, in which:

the power generation sensor includes:

a magnetic wire in which a large Barkhausen effect occurs; and a coil wound around the magnetic wire;

the magnetic wire is disposed in a radial direction of the rotating body;

the rotating body includes:

one supporting body formed by a soft magnetic body; and a plurality of magnetic-field generation sources mounted on the supporting body at even intervals in a circumferential direction;

the plurality of magnetic-field generation sources each have a pair of an N-pole and an S-pole and have a magnetization direction in parallel to a rotational axis direction of the rotating body;

magnetization directions of two adjacent ones of the magnetic-field generation sources are different from each other;

an outer-circumferential-side diameter of a rotation trajectory of the plurality of magnetic-field generation sources is greater than a length of the magnetic wire;

each of the magnetic-field generation source faces at least a part of a region from an axial-direction central portion to an axial-direction first end portion of the magnetic wire in a rotational axis direction when the magnetic-field generation source approaches the magnetic wire;

a mounting surface for the magnetic-field generation source that approaches the magnetic wire with respect to the supporting body is on an axial-direction second end portion side of the magnetic wire; and a direction from the mounting surface of the magnetic-field generation source that approaches the magnetic wire with respect to the supporting body toward the magnetic-field generation source is the same as a direction from the axial-direction second end portion toward the axial-direction first end portion of the magnetic wire.

Supplement B2

The rotation detector according to Supplement B1, in which the supporting body includes a flange portion protruding in the radial direction.

Supplement B3

The rotation detector according to Supplement B1, in which the magnetic wire is disposed so as to intersect with a rotational axis of the rotating body.

Supplement B4

The rotation detector according to Supplement B1, in which the plurality of magnetic-field generation sources are a plurality of magnets having a same shape.

Supplement B5

The rotation detector according to Supplement B1, in which the plurality of magnetic-field generation sources are one magnet formed by multipolar-magnetizing a ring-like hard magnetic body.

Supplement B6

The rotation detector according to Supplement B1, further including:

a magnetic sensor that detects a magnetic field from the magnetic-field generation source when a signal is output from the power generation sensor; and a circuit that obtains a number of rotations and a rotation direction of the rotating body on a basis of a signal output by the power generation sensor and the magnetic sensor.

Supplement B7

The rotation detector according to Supplement B6, in which the power generation sensor, the magnetic sensor, and the circuit are mounted on the same board.

Supplement C1

A detector that detects motion of a moving body by use of a power generation sensor, in which:

the power generation sensor includes:

a magnetic wire in which a large Barkhausen effect occurs; and a coil wound around the magnetic wire;

the moving body includes:

a soft magnetic body portion; and a plurality of magnetic-field generation sources mounted on the soft magnetic body portion at even intervals;

the plurality of magnetic-field generation sources each have a pair of an N-pole and an S-pole;

magnetic poles of two adjacent ones of the magnetic-field generation sources on a mounting-direction outer side of the magnetic-field generation sources are heteropolar;

the power generation sensor is disposed in a vicinity of a trajectory drawn by the plurality of magnetic-field generation sources by the motion of the moving body;

a direction of motion of each of the magnetic-field generation sources when the magnetic-field generation source approaches the power generation sensor is perpendicular to an axial direction of the magnetic wire;

a magnetization direction of the magnetic-field generation source when the magnetic-field generation source approaches the power generation sensor is parallel to the axial direction of the magnetic wire or parallel to a direction facing the magnetic wire (in other words, perpendicular to both directions, that is, the axial direction of the magnetic wire and the direction of motion of the magnetic-field generation source); and at least one part of a place from an axial-direction central portion to an axial-direction first end portion of the magnetic wire faces the magnetic-field generation source, and at least a part of a place from the at least one part to an axial-direction second end portion of the magnetic wire faces the soft magnetic body portion when the magnetic-field generation source approaches the power generation sensor.

Supplement C2

The detector according to Supplement C1, in which the soft magnetic body portion faces the axial-direction second end portion of the magnetic wire when the magnetic-field generation source approaches the power generation sensor.

Supplement C3

The detector according to Supplement C1 or C2, in which:

the moving body rotationally moves; and the magnetic wire is disposed in parallel to a rotational axis of the rotation motion.

Supplement C4

The detector according to Supplement C1 or C2, in which:

the moving body rotationally moves;

the magnetic wire is on a straight line orthogonal to a rotational axis of the rotation motion; and the axial-direction central portion of the magnetic wire is offset from the rotational axis.

Supplement C5

The detector according to Supplement C4, in which the magnetic wire is disposed so as to intersect with the rotational axis of the rotation motion.

Supplement C6

The detector according to Supplement C4, in which the soft magnetic body portion includes a flange portion protruding in a radial direction.

Supplement C7

The detector according to Supplement C1 or C2, in which the plurality of magnetic-field generation sources are a plurality of magnets having a same shape.

Supplement C8

The detector according to Supplement C1 or C2, in which the plurality of magnetic-field generation sources are one magnet formed by multipolar-magnetizing a ring-like hard magnetic body.

Supplement C9

The detector according to Supplement C1 or C2, in which the number of the magnetic-field generation sources is four.

Supplement C10

The detector according to Supplement C1 or C2, further including:

a magnetic sensor that detects a magnetic field from the magnetic-field generation source when the power generation sensor outputs a signal; and a circuit that obtains a number of rotations and a rotation direction of the moving body on a basis of a signal output by the power generation sensor and the magnetic sensor in accordance with rotation motion of the moving body.

Supplement C11

The detector according to Supplement C10, in which the power generation sensor, the magnetic sensor, and the circuit are mounted on the same board.

The embodiments of the present invention have been described above, but the present invention is not limited to the embodiments described above, and various types of modifications and changes can be made on the basis of the technical idea of the present invention.

REFERENCE SIGNS LIST

100, 200, 300, 400, 500 motion detector
110, 210, 310, 410, 510 moving body
111, 211, 311, 411, 511 soft magnetic body portion
112, 212, 312, 412, 512 magnet
120, 220, 320, 420, 520 power generation sensor
121, 221, 321, 421, 521 magnetic wire
122, 222, 322, 422, 522 coil
440, 540, 541 magnetic sensor
1100, 1200, 1200-1, 1300, 1400, 1400-1, 1400-2 rotation detector
1110, 1210, 1210-1, 1310, 1410, 1410-1 rotating body
1111, 1211, 1211-1, 1311, 1411, 1411-1 supporting body
1112 magnetic-field generation source
1120 power generation sensor
1121 magnetic wire
1122 coil
1211a, 1211-1a flange portion
1440, 1441 magnetic sensor
1500 board
1600 signal processing circuit
1700 connector

The invention claimed is:

1. A detector for detecting motion of a moving body by use of a single power generation sensor, wherein:
the power generation sensor includes:
a magnetic wire in which a large Barkhausen effect occurs; and
a coil wound around the magnetic wire;
the moving body includes:
a soft magnetic body portion; and
a plurality of magnetic-field generation sources mounted on the soft magnetic body portion at even intervals;
the plurality of magnetic-field generation sources each have a pair of an N-pole and an S-pole;
magnetic poles of two adjacent magnetic-field generation sources on a mounting-direction outer side of the magnetic-field generation sources, are heteropolar;
the power generation sensor is disposed so as not to interfere with the moving body;
a direction of motion of each of the magnetic-field generation sources when the magnetic-field generation source approaches the power generation sensor, is perpendicular to an axial direction of the magnetic wire;
a magnetization direction of the magnetic-field generation source when the magnetic-field generation source approaches the power generation sensor, is parallel to the axial direction of the magnetic wire or parallel to a direction facing the magnetic wire; and at least one part of a place from an axial-direction central portion to an axial-direction first end portion of the magnetic wire faces an entire region of the magnetic-field generation source extending along the axial-direction of the magnetic wire, and at least a part of a place from the at least one part to an axial-direction second end portion of the magnetic wire faces the soft magnetic body portion, when the magnetic-field generation source approaches the power generation sensor.

2. The detector according to claim 1, wherein the soft magnetic body portion faces the axial-direction second end portion of the magnetic wire, when the magnetic-field generation source approaches the power generation sensor.

3. The detector according to claim 1, wherein:
the moving body rotationally moves; and
the magnetic wire is disposed in parallel to a rotational axis of the rotation motion.

4. The detector according to claim 1, wherein:
the moving body rotationally moves;
the magnetic wire is on a straight line orthogonal to a rotational axis of the rotation motion; and
the axial-direction central portion of the magnetic wire is offset from the rotational axis.

5. The detector according to claim 4, wherein the magnetic wire is disposed so as to intersect with the rotational axis of the rotation motion.

6. The detector according to claim 4, wherein the soft magnetic body portion includes a flange portion protruding in a radial direction.

7. The detector according to claim 1, wherein the plurality of magnetic-field generation sources is a plurality of magnets having a same shape.

8. The detector according to claim 1, wherein the plurality of magnetic-field generation sources forms a multipolar magnet by magnetizing an annular hard magnetic body.

9. The detector according to claim 1, wherein the number of the magnetic-field generation sources is four.

10. The detector according to claim 1, further including:
a magnetic sensor that detects a magnetic field from the magnetic-field generation source when the power generation sensor outputs a signal; and
a circuit that obtains a number of rotations and a rotation direction of the moving body on a basis of a signal output by the power generation sensor and the magnetic sensor in accordance with rotation motion of the moving body.

11. The detector according to claim 10, wherein the power generation sensor, the magnetic sensor, and the circuit are mounted on one board.

12. The detector according to claim 1, wherein a size of one or more of the plurality of magnetic-field generation sources along the magnetic wire is half or less than half a length of the magnetic wire.

13. A detector for detecting motion of a moving body by use of a power generation sensor, wherein:
the power generation sensor includes:
a magnetic wire in which a large Barkhausen effect occurs; and
a coil wound around the magnetic wire;
the moving body includes: a soft magnetic body portion; and
a plurality of magnetic-field generation sources mounted on the soft magnetic body portion at even intervals;
the plurality of magnetic-field generation sources each have a pair of an N-pole and an S-pole;

magnetic poles of two adjacent magnetic-field generation sources on a mounting-direction outer side of the magnetic-field generation sources, are heteropolar;

the power generation sensor is disposed so as not to interfere with the moving body;

a direction of motion of each of the magnetic-field generation sources when the magnetic-field generation source approaches the power generation sensor, is perpendicular to an axial direction of the magnetic wire;

a magnetization direction of the magnetic-field generation source when the magnetic-field generation source approaches the power generation sensor, is parallel to the axial direction of the magnetic wire or parallel to a direction facing the magnetic wire; and at least one part of a place from an axial-direction central portion to an axial-direction first end portion of the magnetic wire faces the magnetic-field generation source, and at least a part of a place from the at least one part to an axial-direction second end portion of the magnetic wire faces the soft magnetic body portion, when the magnetic-field generation source approaches the power generation sensor, wherein the moving body rotationally moves, and the magnetic wire is on a straight line orthogonal to a rotational axis of the rotation motion, wherein the axial-direction central portion of the magnetic wire is offset from the rotational axis, and wherein the magnetic wire is disposed so as to intersect with the rotational axis of the rotation motion.

* * * * *